US005428610A

United States Patent [19]

Davis

[11] Patent Number: 5,428,610

[45] Date of Patent: Jun. 27, 1995

[54] FM RADIO SYSTEM EMPLOYING TIME SHARED WIDE SCA FOR DIGITAL DATA BAND

[75] Inventor: Mark Davis, Carlsbad, Calif.

[73] Assignee: World Communication Ventures, Inc., Casper, Wyo.

[21] Appl. No.: 974,296

[22] Filed: Nov. 10, 1992

[51] Int. Cl.[6] .................................. H04J 1/14

[52] U.S. Cl. .................................. 370/73; 370/69.1; 370/71; 370/76; 370/120; 370/123; 370/11; 455/45

[58] Field of Search .................. 370/11, 95.1, 69.1, 370/73, 76, 71, 84, 120, 122, 121, 123, 110.4, 112; 340/792, 825.44; 445/45, 70, 72, 38.2, 205, 212, 218

[56] References Cited

U.S. PATENT DOCUMENTS

| | | | |
|---|---|---|---|
| 2,616,975 | 11/1952 | Bond | 370/112 |
| 2,852,609 | 9/1958 | Plouffe | 370/112 |
| 4,379,947 | 4/1983 | Warner | 455/45 |
| 4,417,349 | 11/1983 | Hills et al. | 375/60 |
| 4,450,589 | 5/1984 | Eilers et al. | 455/45 |
| 4,476,581 | 10/1984 | Bragas | 455/45 |
| 4,523,311 | 6/1985 | Lee et al. | 370/69.1 |
| 4,584,708 | 4/1986 | Eilers et al. | 455/45 |
| 4,646,290 | 2/1987 | Hills | 370/84 |
| 4,660,193 | 4/1987 | Young et al. | 455/45 |
| 4,720,873 | 1/1988 | Goodman et al. | 370/76 |
| 5,121,409 | 6/1992 | Goss | 370/69.1 |
| 5,146,612 | 9/1992 | Grosjean et al. | 455/45 |
| 5,193,213 | 3/1993 | Chon | 455/45 |
| 5,239,540 | 8/1993 | Rovira et al. | 455/45 |

FOREIGN PATENT DOCUMENTS

| | | | |
|---|---|---|---|
| WO8503824 | 8/1985 | WIPO | 455/45 |

*Primary Examiner*—Douglas W. Olms
*Assistant Examiner*—Huy D. Vu
*Attorney, Agent, or Firm*—Finnegan, Henderson, Farabow, Garrett & Dunner

[57] ABSTRACT

A wide band, wide area FM-SCA radio system has a central station that transmits multiple audio signals and digital data signals through a satellite network to FM stations participating in the system. Each FM station demodulated and time multiplexes the audio and digital signals with a control signal to form a first baseband waveform having a frequency range corresponding to the SCA frequency bandwidth.

The first baseband waveform and a regular FM baseband waveform are combined into a composite band waveform that is single-sideband modulated onto the station carrier for retransmission to FM-SCA receivers in the coverage area.

Each FM-SCA receiver demodulates the received signal and separately processes the regular FM signal, the FM-SCA audio signals, and the FM-SCA digital data signals. A user interface is provided for audio output selection.

40 Claims, 15 Drawing Sheets

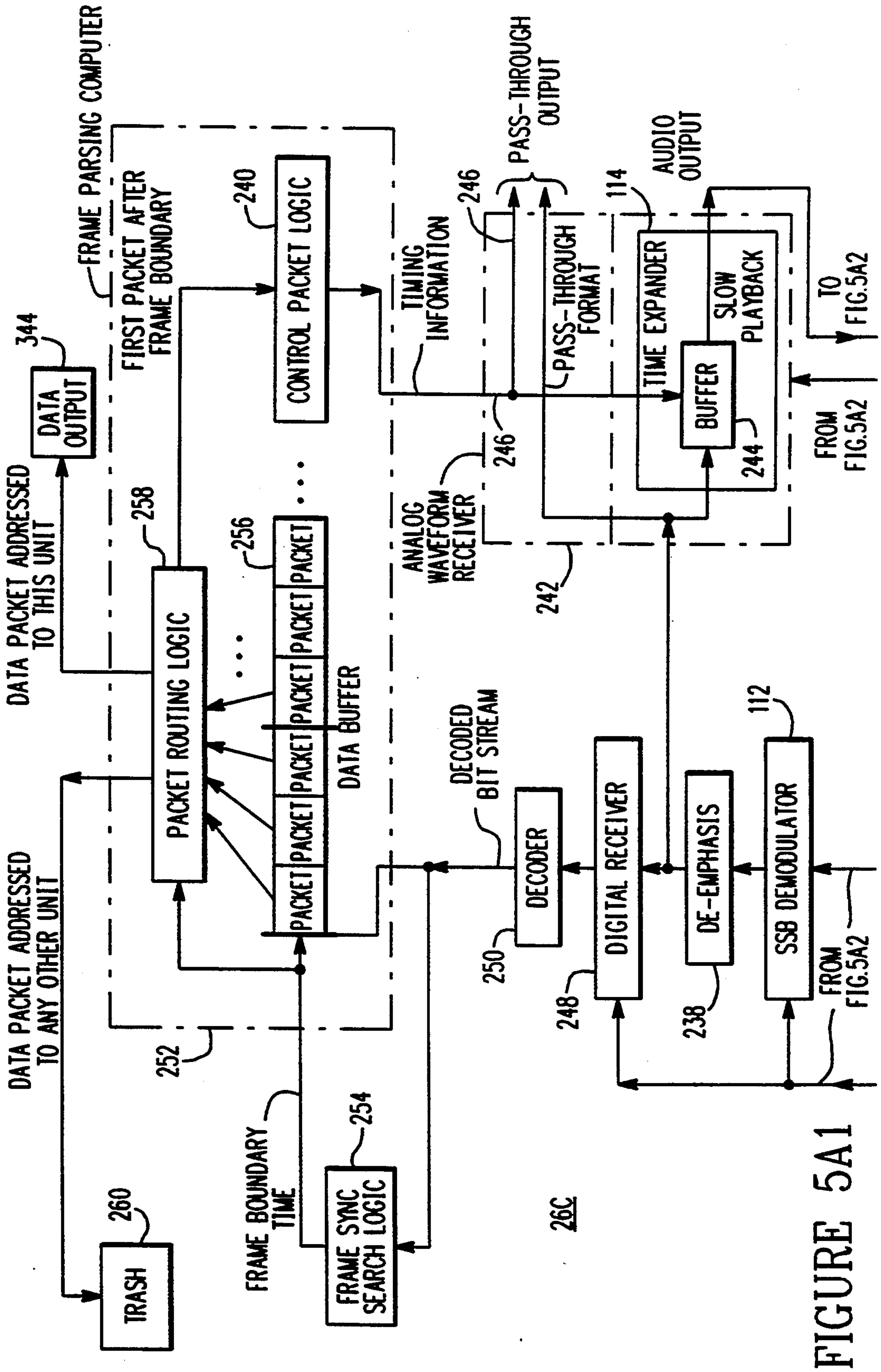
FIGURE 5A1

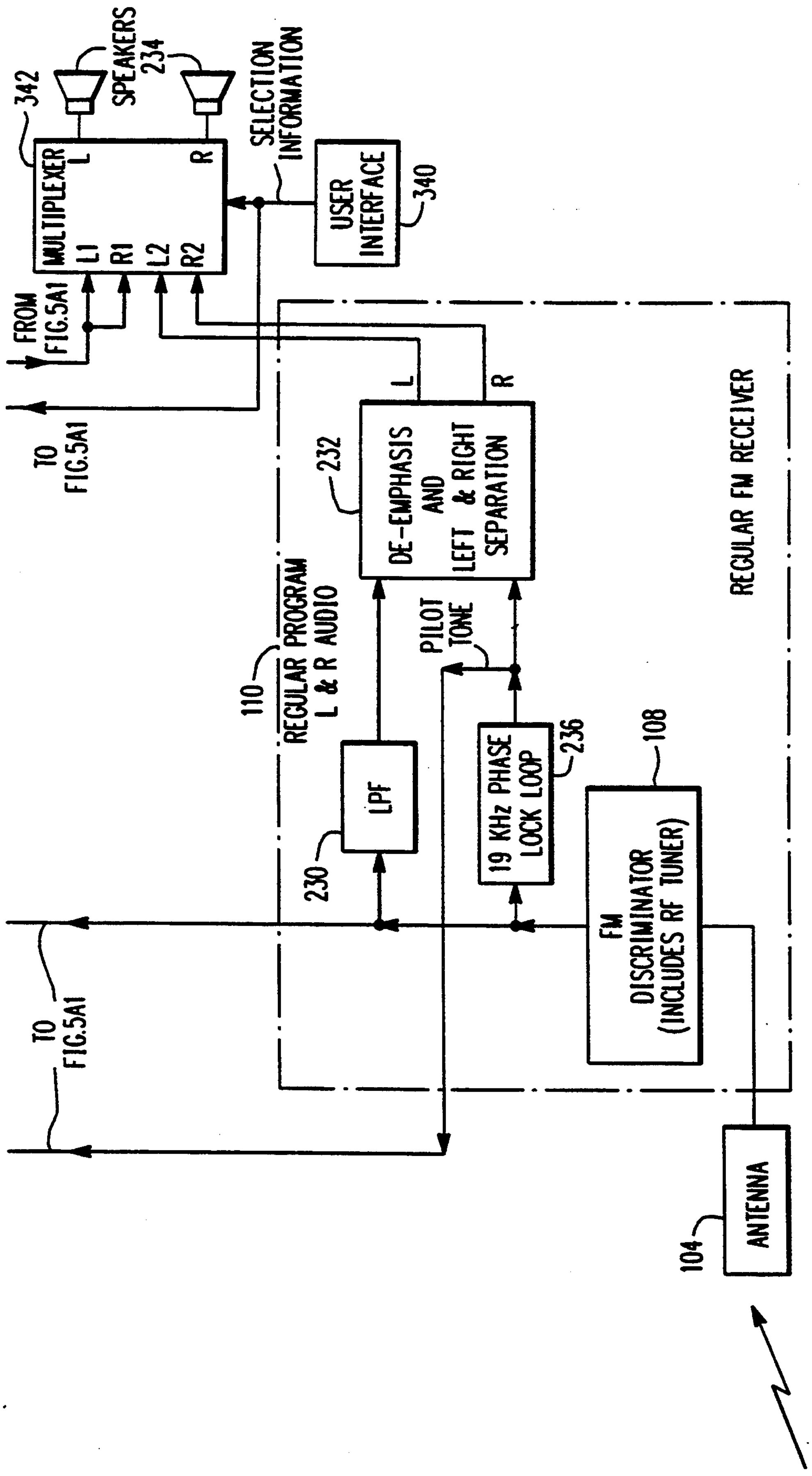
FIGURE 5A2

FM RADIO SYSTEM EMPLOYING TIME SHARED WIDE SCA FOR DIGITAL DATA BAND

BACKGROUND OF THE INVENTION

The present invention relates to data communications and more particularly to an FM radio communication system and method that efficiently employs the SCA band of system FM stations for wide area transmission and reception of digital data.

In the past, the public phone system has provided cost effective business and other data communication where the receivers are located at known fixed locations. However, wiring cannot be used for data communication to mobile receivers, and the public phone system is thus not able to provide data communication for mobile receivers.

Radio transmission has been employed with the use of especially dedicated frequencies to transmit business or other data such as paging data or stock market quotes to mobile and fixed receivers. However, serious disadvantages have been imposed on the dedicated frequency approach to data communications as a result of limited availability of dedicated frequencies and high capital and operating costs. Further, it has not been economically feasible for low volume or infrequent users to employ a dedicated frequency for data communication.

In the United States, FM radio stations are granted a license for a range of frequencies that may be used for the main FM radio signal but which is substantially larger than the minimum range required for the main FM radio signal. Historically, the excess bandwidth has not been used for purposes other than transmitting the main FM radio signal, but radio stations are now free to lease frequencies in the excess bandwidth to other users through a service known as Subsidiary Communications Authorization ("SCA"). The FCC has deregulated SCA service and stations are free to carry SCA services without prior authorization, so long as all uses of the frequency are within the regulations imposed on the license holder.

The FM radio baseband signal has an authorized range of 0 to 99 KHz. The portion of the baseband used for primary FM radio covers the frequency range 0 to 53 KHz, and the SCA band is the portion of the baseband signal that lies in the range from 53 KHz to 99 KHz. Generally, the percentage deviation of the FM signal that results from the SCA must not exceed 20% (assuming that the basic FM programming is stereophonic) with 10% being attributable to the portion of the SCA signal in the range from 53 to 75 KHz and 10% from the portion of the SCA signal in the 75 KHz to 99 KHz range.

There is also a regulatory limit on the amount of out-of-band emissions from the SCA signals that fall in the passband of the basic program signal. When the SCA baseband is added to the primary FM radio baseband, the entire baseband is referred to as a "composite" baseband.

Since an FM station transmits basic FM radio programming in the 0 to 53 kHz range, the station may lease all or a portion of the unused SCA bandwidth 53 to 99 KHz to other users without a requirement for licensing the lessee(s). Historically, the unused frequency range has been divided into three parts and a user has leased one or more of those parts depending on user requirements. Typical current uses of FM-SCA include paging, transmission of stock market information, background music, and traffic reporting. A special receiver is necessary to extract the SCA service from the composite signal.

The FM-SCA band has also been employed by FM stations to transmit business or other data, such as paging system data. Prior FM-SCA data transmission has generally been based on a frequency assignment system and each FM-SCA user accordingly has been limited to an assigned narrow band signal within the SCA band A typical assigned band is 2 to 3 KHz wide. Typical examples of prior frequency divided FM-SCA transmitting schemes are set forth in: U.S. Pat. No. 4,379,947, entitled "System for Transmitting Data simultaneously With Audio" and issued to Paul Warner on Apr. 12., 1983, and U.S. Pat. No. 5,146,612 entitled "Technique for Using a Subcarrier Frequency of a Radio Station to Transmit, Receive and Display A Message Together With Audio Reproduction of the Radio Program", and issued to Grosjean et al., on Sep. 8, 1992.

In prior paging systems, phone number data, and possibly some message data, is transmitted over a wide area through regional FM stations with the use of a narrow SCA frequency band at each FM station. Once transmitted data is received by a mobile receiver, a beep is generated by the receiver and a return call or other required action may be undertaken.

As in the case of the dedicated frequency approach, the transmission of paging or other data through an assigned SCA frequency has had limited user availability and has been costly. It has generally been inefficient since at times the transmission system is largely unused, while, at peak traffic times, capacity constraints delay messages. Moreover, the SCA assigned frequency approach has generally incurred costly administrative overhead required for multiple lease setups.

While data communication between computers has been provided with cost effectiveness through the public telephone network, little development has occurred in the potential use of FM radio for intercomputer data communication, especially where at least one of the communicating computers is a mobile (or portable) computer. As a result, business, government and other organizations have had limited capability for communicating inventory information, work order information, and other financial or work related data especially to recipients having a portable computer.

A mobile cellular phone with a modem can establish mobile data communications by phone system connection to another phone having a modem. However, such data communication is point-to-point and requires that a phone connection be provided.

Additionally, in the cellular telephone industry, significant effort has been expended to make roaming more convenient. However, in the absence of appropriate data communication capabilities, calls generally cannot be placed to a roamer if the location of the roamer's cellular phone is unknown.

Stolen vehicle identification systems represent another specific prior art area where limited data communication capability has limited the effectiveness of system operation. A hidden transmitter in a stolen car must be activated to mark the car location. As long as the car is in the area covered by the identification system, a locally transmitted high frequency signal can be used to activate the hidden transmitter in a stolen car. However, with limited prior art data communication capability, once a car has been moved to an area outside the range of the identification system, the hidden transmitter may be activated only if a costly system is employed to send activation signals throughout the nation or other wide geographic area.

There are undoubtedly many other potential systems or applications involving wide area mobile receivers that have remained undeveloped in the absence of prior art data communication capabilities that might only be available, if at all, through costly capital and/or operating expenditures.

In a copending patent application Ser. No. 07/737,407, entitled "COMMUNICATIONS SYSTEM", filed by Irl Benham and David A. Wright on Jul. 29, 1991, assigned to World Broadcasting Development, Inc., which is an affiliate of the present assignee, and herein incorporated by reference, there is disclosed a new multi-channel transmission system for national or other wide area transmission through time shared, wide band use of the SCA band of regional FM radio stations (hereinafter referred to as the wide band FM-SCA radio system).

In operation, the wide band FM-SCA radio system uses essentially the entire available FM-SCA spectrum as a single "wide band" channel. Information signals to be transmitted are divided into segments, fractions of a second long. The information segments are coded, and audio information is compressed prior to transmission. The signal segmentation allows a variety of different signals to be transmitted simultaneously over the FM-SCA spectrum through use of time sharing. A receiver responds to a code sent at the beginning of each signal segment and uses it to put the segments back together in the proper sequence. The entire process can have little or no noticeable effect on the sound quality of the audio content of the transmission.

The wide band FM-SCA radio system constructs a 0 –42 kHz waveform, and combines several techniques which allow much more information to be transmitted on the SCA band of each FM station than was previously available. This is accomplished by the use of single side band (SSB) modulation, use of the entire SCA bandwidth at once with time division multiplexing, and, in the case of audio transmission, use of time-compression. SSB modulation achieves twice the spectral efficiency of modulation containing two sidebands.

As indicated, a time-divided structure is used by the wide band FM-SCA radio system for sharing the SCA bandwidth among different users. Each user has access to the entire SCA channel for a fraction of the time, as opposed to frequency-division where each user has access to a portion of the spectrum all of the time. In the disclosed embodiment, time is divided into 140 millisecond frames, which correspond to and are synchronous with 2,660 cycles of the 19 kHz pilot tone. A small portion of the frame is devoted to digital control data that specifies the exact time assignments of the audio signals and their content.

The wide band FM-SCA radio system has extensive information transmitting capacity. The referenced copending application discloses a basic system structured for the transmission of audio information.

As indicated above, prior art transmission of data information to mobile receivers has been characterized with disadvantages that have limited the availability and use of such data transmission. A basic need has thus existed for wide area or national transmission of data information to receivers that may be mobile or fixed on an efficient and cost effective basis. The wide band FM-SCA radio system can accommodate multiple users simultaneously and is thus well suited for meeting the need for economic transmission of data information to mobile receivers over a wide or national geographic area.

SUMMARY OF THE INVENTION

The present invention is directed to a wide band FM-SCA transmission system adapted to transmit audio and/or data information efficiently and cost effectively to mobile receivers.

In accordance with the invention, a wide band, wide area FM-SCA radio system is provided for transmitting system at least digital data signals and if desired analog signals and comprises first means for transmitting the analog and digital signals to participating FM stations throughout a wide geographic area. Each participating FM station having apparatus includes means for receiving the system signals and first means for demodulating and processing the system analog signals if included.

Second means are provided for demodulating and processing the digital data signals to generate a waveform representing a digital data stream. Means are provided for time multiplexing the digital data waveform and at least one of the demodulated analog signals to form an intermediate waveform having a frequency range substantially corresponding to the SCA frequency bandwidth.

Means are provided for generating a control signal for inclusion in the first baseband waveform to enable receiver processing of any selected system signal transmitted by the FM station. Means are provided for combining the intermediate waveform and a regular FM baseband waveform into a composite baseband waveform.

Means are provided for FM modulating the composite baseband waveform onto the station carrier frequency signal. Second means are provided for transmitting the FM modulated signal.

BRIEF DESCRIPTION OF THE DRAWINGS

The accompanying drawings, which are incorporated in and constitute a part of this specification, illustrate a preferred embodiment of the invention and together with the description provide an explanation of the objects, advantages and principles of the invention. In the drawings:

FIGS. 5A1 and 5A2 illustrate in still greater detail the FM receiver shown in FIG. 3A;

DESCRIPTION OF THE PREFERRED EMBODIMENT

OVERVIEW—WIDE BAND FM-SCA RADIO TRANSMISSION SYSTEM

Figure 1:
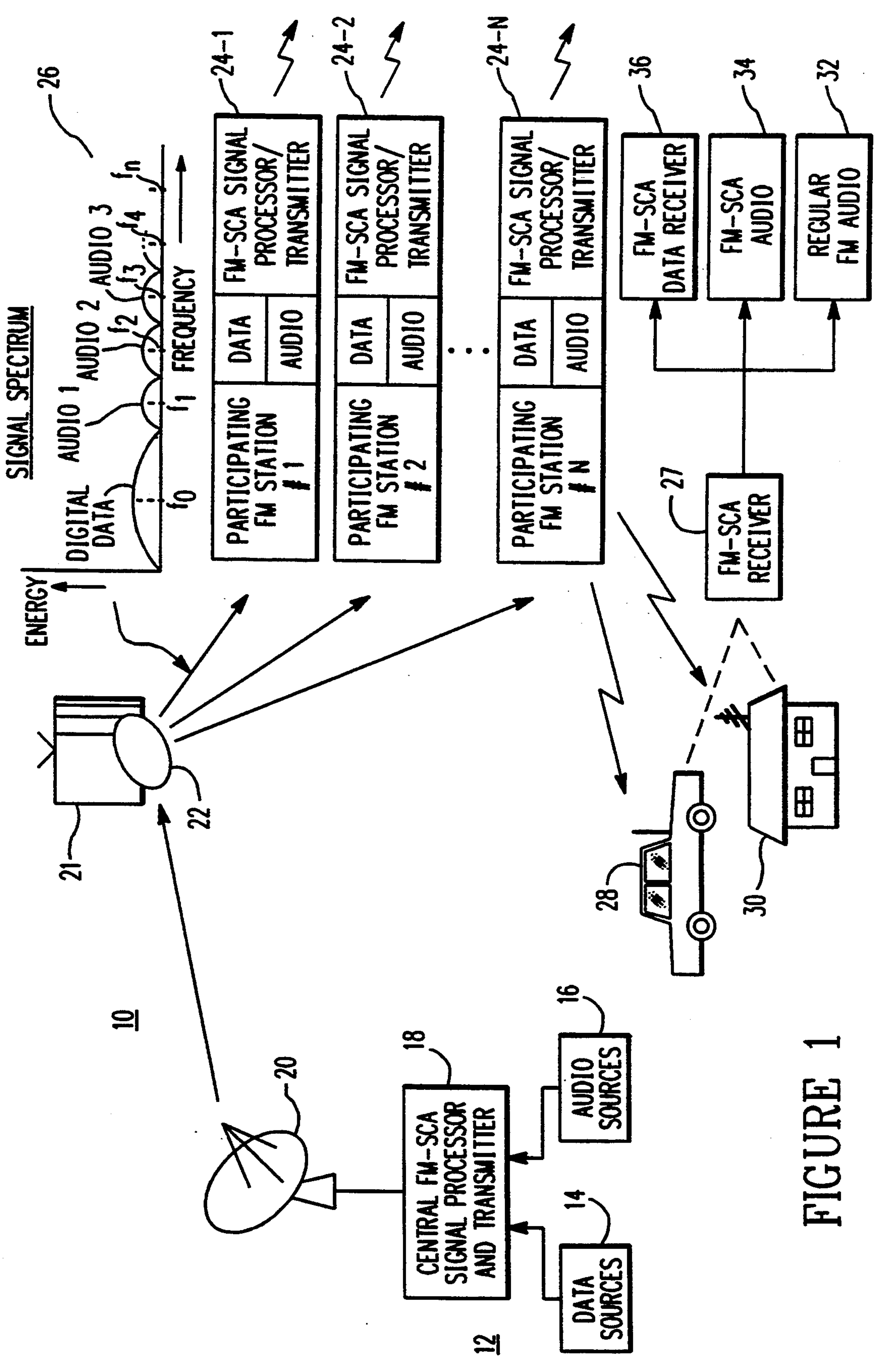
FIG. 1 presents a block diagram representation of the preferred embodiment of an FM radio communication system that employs the SCA bands of multiple participating FM radio stations to provide wide area transmission and reception of multiplexed digital data in accordance with the principles of the invention.

More particularly, there is shown in FIG. 1 an FM radio transmission system 10 arranged in accordance with the principles of the invention preferably to provide wide area communication for both voice and data signals. The FM radio system 10 is a wide band FM-SCA radio system having a central transmitting station 12 to which various data and audio program sources 14 and 16 are coupled for wide area transmission.

A central data source 14 may, for example, be a computer having a phone modem that receives data over the phone lines. A central audio source 16 may, for example, be live sound or a prerecorded tape.

Data and voice signals from the sources 14 and 16 are processed for transmission and coupled to an antenna 20 as indicated by a block 18. A system or network signal is accordingly transmitted from the antenna 20 to an antenna 22 on a satellite 21.

Figure 2:
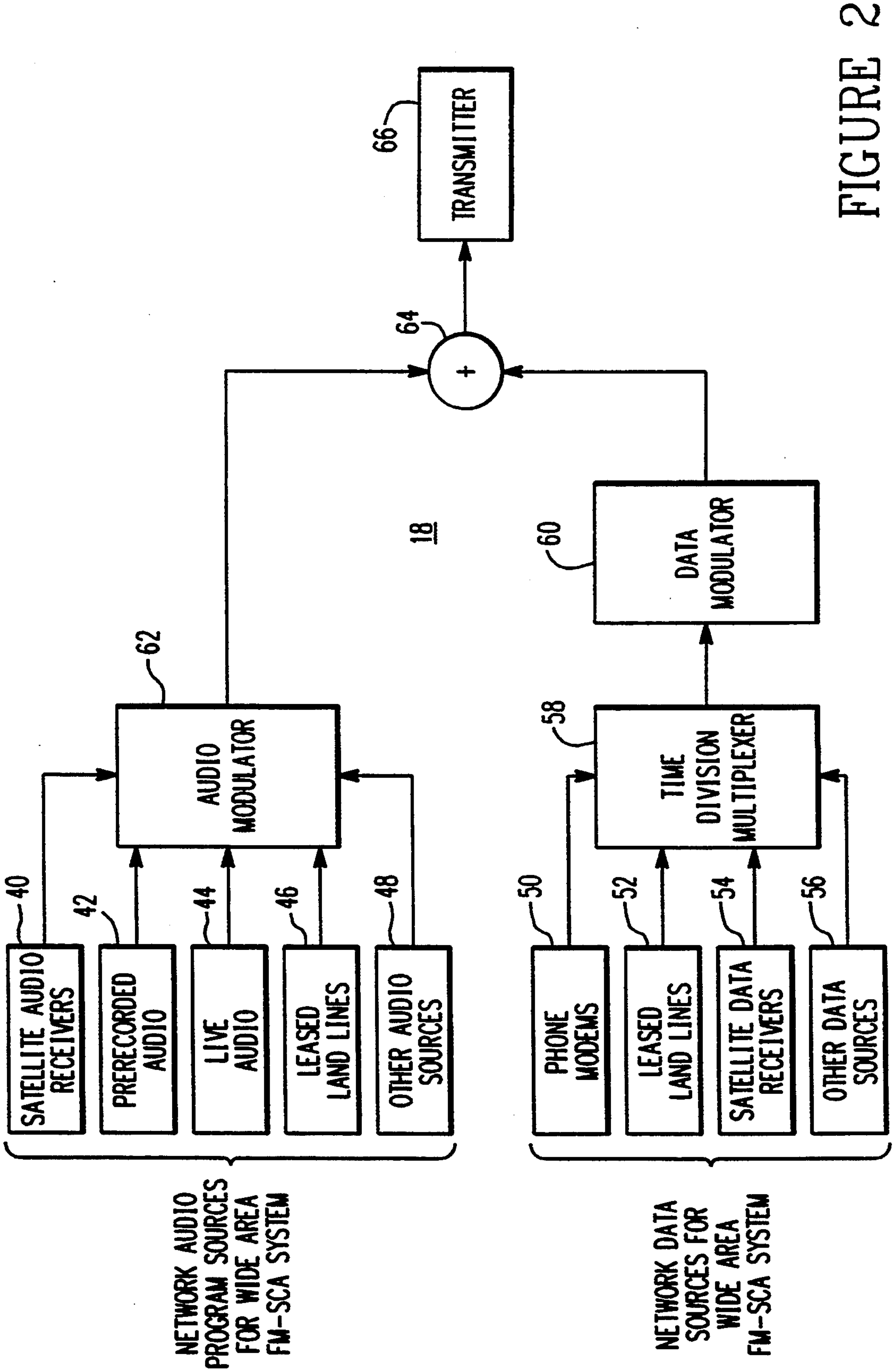
FIG. 2 is a more detailed block diagram for a central transmitting station employed in the system of FIG. 1.

As shown in FIG. 2, possible network or system audio sources include satellite audio programs sent to receivers 40, prerecorded audio 42, live audio 44, and leased land lines 46 among other sources 48. Possible system data sources include phone modems 50, leased land lines 52, and satellite data receivers 54 among other sources 56.

In this preferred embodiment, the data signals are first time division multiplexed by a multiplexer 58 and then appropriately modulated onto a base data carrier $f_o$ by a data modulator 60. The audio signals are appropriately modulated onto multiple audio carriers $f_1$, $f_2$, $f_3$, - - - $f_m$ by an audio modulator 62 and the modulated data and audio signals are combined by an adder 64 and then processed by a transmitter 66 for transmission.

For more complete information on audio programming and audio signal processing in the system 10 reference is made to the previously referenced copending application.

The system signal is processed by satellite circuitry and retransmitted from the satellite antenna 22 to multiple FM stations 24-1, 24-2, through 24-N which are, located over a wide geographical area such as that of the entire United States. The system signal generally has a spectrum as indicated by graph 26.

As shown, and as considered in greater detail hereinafter, each FM station operates in accordance with the invention to separate the digital data and audio signals and form an SCA-bond waveform from the separated signals. The SCA-bond waveform signal is then combined with the normal FM audio signal and transmitted as a station signal over the area of station coverage. Each audio listener or data user receives the station signal through an especially adapted receiver 27 which may be mobile as symbolized by a car 28 or fixed as symbolized by a house 30. The station receives all programs but normally would retransmit only preselected programs.

The user of the receiver can select any of the retransmitted programs. Thus, regular FM audio programs or available FM-SCA audio programs can be selected as indicated by blocks 32 and 34.

Data is selected for reception by an FM-SCA data receiver 36. Various kinds of data can be transmitted and received within the system 10 in accordance with the invention. For example, the data receiver 36 may be a personal computer to which inventory or sales or other business data files may be downloaded. As other examples among numerous possibilities, the data receiver 36 may be a general message receiving and display device, a paging responder, or a data receiver especially adapted for receiving and displaying stock market quotes.

Figure 3A:
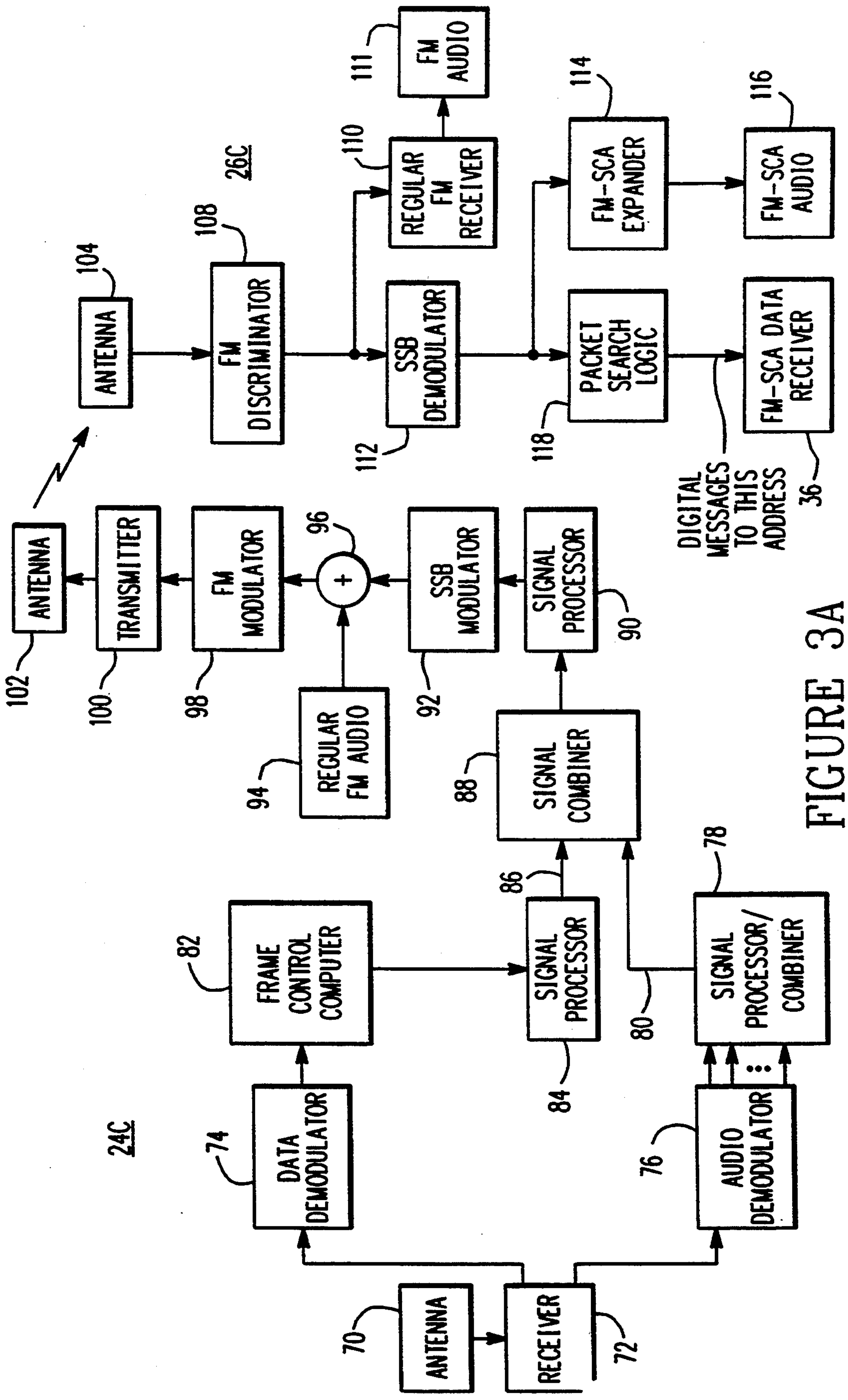
FIG. 3A represents with greater functional block detail a representative regional FM radio station and an FM receiver to which signals are being transmitted from the representative FM station in the system of FIG. 1.

In FIG. 3A, station circuitry 24C for each FM station 24-1 through 24-N (FIG. 1) and receiver circuitry 26C for each FM-SCA receiver 26 are shown with somewhat greater functional block detail. The centrally transmitted signal from the satellite antenna 22 is received by a station antenna 70 and passed to a station receiver 72. The satellite signal is downconverted and divided into its analog data and analog audio components for demodulation respectively by a data demodulator 74 and an audio demodulator 76.

The audio program signals are respectively separated and demodulated by the audio demodulator unit 76 and applied to a signal processor/combiner 78 where the audio signals are formed into a single audio analog output signal 80. The analog data signals are demodulated by the data demodulator 74 and the resultant digital data signals are applied to a frame control computer 82 for organization into framed data signals in accordance with a preselected frame format.

The output signal from the frame control computer 82 contains framed digital messages and it is coupled to a digital signal processor 84. A processed digital signal 86 from the signal processor 84 and the processed audio signal 80 are coupled to a signal combiner 88 which generates a combined signal for further processing by a signal processor 90.

The combined audio and digital signal is applied to a modulator 92 where it is single sideband amplitude modulated preferably onto the third harmonic of the 19 KHz pilot signal to create an SCA-bond waveform baseband signal that spans essentially the entire SCA band, i.e. preferably from 57 KHz through 99 KHz.

An FM baseband signal 92W (spanning a frequency band from 0 to 53 KHz) for regular FM programming is generated by block 94 and applied along with the SCA-bond waveform baseband signal to an adder 96.

The adder output signal is a composite baseband signal that spans the frequency range 0 to 99 KHz and is FM modulated onto the station carrier frequency by an FM modulator 98. A transmitter 100 generates a station signal that is coupled to an antenna 102 for transmission to the station coverage area.

Figures 3B, 3C:
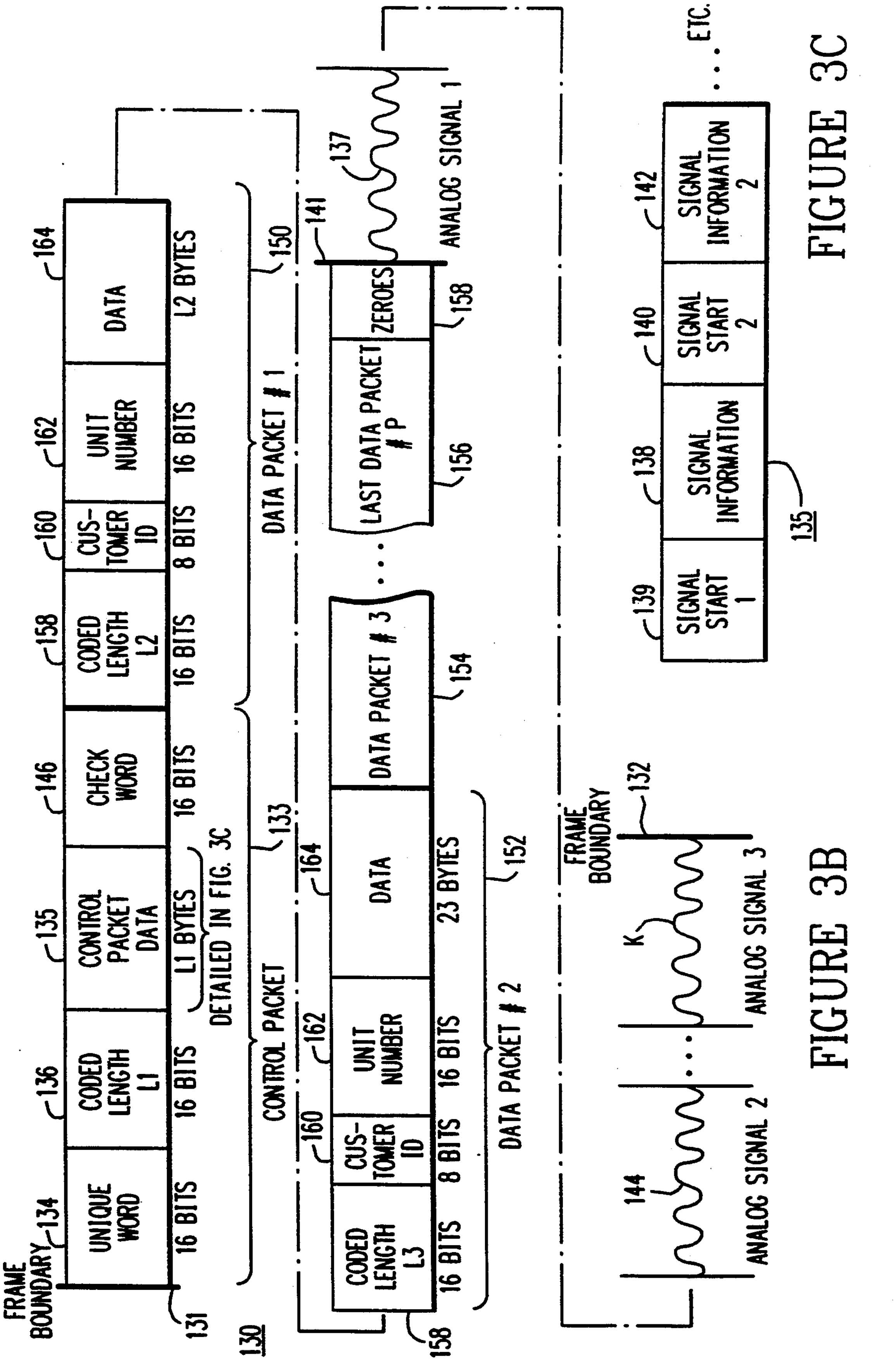
FIGS. 3B and 3C graphically represent a data frame format employed in FM station transmission signals in the system of FIG. 1.
Figure 3D:
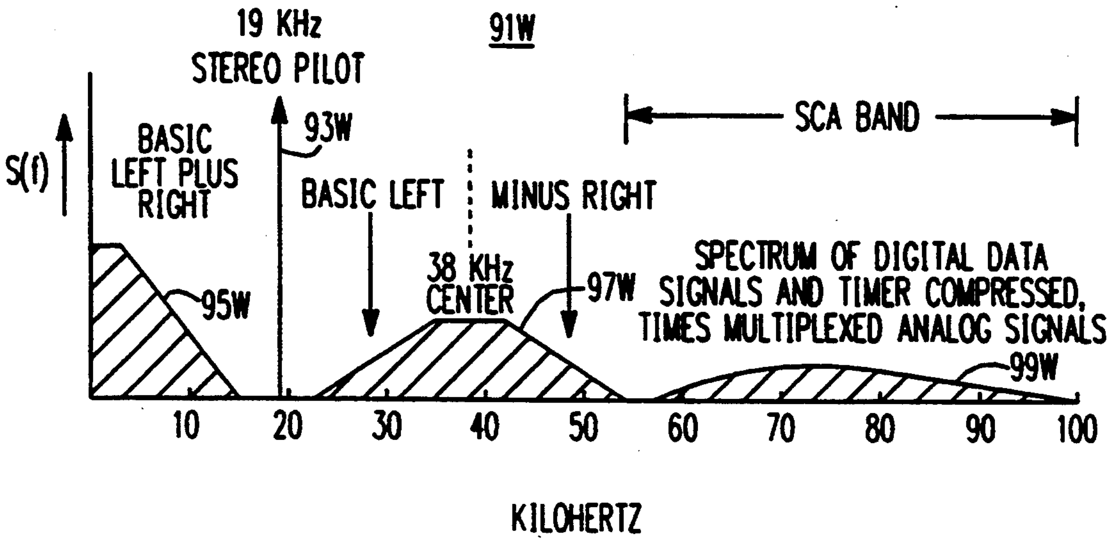
FIG. 3D shows an energy spectrum for a composite baseband waveform generated to include time multiplexed digital data and analog signals across an SCA frequency band thereof in accordance with the invention.

In FIG. 3D, there is graphically illustrated an energy spectrum for a representative composite baseband waveform 91W that is generated to carry regular FM and digital data/audio FM-SCA signals in accordance with the invention.

In the waveform 91W, the 19 KHz pilot signal is indicated by reference character 93W and the lower and upper bands of a regular FM audio signal are indicated by reference characters 95W and 97W. An SCA-bond waveform baseband portion 99W of the composite baseband 91W spans essentially the whole SCA spectrum and carries network digital data and audio signals that the transmitting station has subscribed to for retransmission to receivers in its coverage area.

The receiver circuitry 26C in each FM-SCA receiver 27 employs an antenna 104 that receives the FM station signal which is downconverted and applied to an FM discriminator 108 for demodulation.

The demodulated station signal is divided into its baseband and SCA-bond components and the regular FM baseband signal is processed through a regular FM receiver 110 for audio output as indicated by block 111 (corresponding to the block 32 in FIG. 1). The SCA-bond waveform baseband signal is applied to a single sideband demodulator 112.

The demodulated FM-SCA output is divided into its audio and digital data components. Thus, the audio component, having been time compressed, is processed by an FM-SCA expander 114 for audio output as indicated by block 116 (corresponding to the block 34 in FIG. 1).

The digital data component is applied to packet search logic 118 which identifies those messages destined to the address of the particular receiver 26 in which the station signal is being processed. The identified digital messages are then coupled to the FM-SCA data receiver 36 for message display, processing or other response.

Time Frame Format for Transmitted FM-SCA Signals

The primary purpose of the time framing of station transmitted FM-SCA signals is to provide a reference by which the signal receiver can synchronize to the transmitted signals. In applying the present invention, the basic time frame format is the same for all stations, but the signals transmitted within the each time frame vary from station to station according to the station audio programming and according to the digital data being serviced through the particular station.

The basic time format employed for transmitted FM-SCA signals in the preferred embodiment; is graphically illustrated in FIGS. 3B and 3C. Thus, a time frame 130 is 140 milliseconds long with starting and ending boundaries indicated by reference characters 131 and 132. The starting frame, boundary 131 is marked by a negative-to-positive crossing of the 19 KHz pilot waveform. The ending frame boundary 134 is also the starting frame boundary for the next time frame.

Within the time frame 130, time is provided for transmission of digital data signals (including digital control and message data signals), audio (or other analog signals), or both digital data and analog signals. In applying the present invention, either digital data signals or both digital data and analog signals may be transmitted. In the previously referenced copending patent application, the detailed embodiment provides for transmission of a control signal and analog signals.

The time taken to transmit digital data depends on the transmitter bit generating rate. The bit rate in turn depends on the symbol rate and the encoding rate (i.e., bits per symbol). In the preferred embodiment, symbol generation is clocked to the station pilot waveform. A symbol is generated for each half cycle of the pilot; waveform. Since the symbol generating rate is 38,000 symbols per second, a total of 5320 symbols may be generated in each 140 millisecond (0.14 second) time frame.

However, station transmitting time would usually be allocated to at least some audio or other analog signals. Since no bits are generated during any allocated analog time in the time frame, the maximum number of digital data bits transmittable in each time frame are reduced accordingly. Generally, the frame may contain any composition of digital data packets and time compressed analog signals so long as the total time required for all uses does not excess 140 milliseconds for each frame.

For example, an FM station may carry an SCA audio program which has non-critical music quality and requires an analog signal frame time of 20 milliseconds and an SCA audio program which has regular voice quality and requires an analog signal frame time of 10 milliseconds. The remaining frame time is accordingly available for digital message data except for that frame time needed for transmission of control data.

Non-critical music is provided on a 6 KHz channel whereas regular voice is provided on a 3 KHz channel. High fidelity music requires a 12 KHz channel and correspondingly higher frame time.

The present invention is operative where at least some frame time is dedicated to digital data. In the extreme case, an FM station may transmit no audio and no other analog FM-SCA and dedicate all of the frame time not used for control data to digital message data.

With reference now to the frame format detail, a control data packet 133 is the first data packet generated in the time frame 130. A unique word 134 is generated as a frame synchronizing signal for receivers preferably at the start of control data packet: 133 and the frame 130. A total of 16 bits are provided for the synchronizing signal 134.

When a receiver is turned on and receives a synchronizing signal 134, a response is generated in receiver timing circuitry to align receiver timing with the frame timing. Thus, any receiver action that must be taken at a defined timepoint in the time frame will in fact be taken at that timepoint because of the synchronization of the receiver time to the frame time by the synchronizing signal 134. Normally, synchronization is implemented within the occurrence of two or three time frames after the detection of a frame boundary.

The next digital word in the frame 130 is a 16 bit coded length word 136 that defines the byte length L1 of control data 135 which is generated after the length word 136. The 16 bits are used to indicate an 8 bit length with half rate coding. As a result, system receivers obtain information that defines when the control data packet 133 ends and the first data packet starts.

As shown in FIG. 3C, the control data 135 has a plurality of field components. A first field 139 contains a 12 bit binary number that defines, in the preferred embodiment, a start time for a first transmitted analog signal 137. The 12 bit binary number is between 0 and 2659 and specifies the cycle of the pilot tone within the time frame at which the first analog signal starts. The station transmitting circuitry responds accordingly and retransmits the analog signal 137 at the determined time.

A 12 bit data field 138 next provides information related to the analog signal 137. Such information includes the time length of the analog signal which determines the quality for audio analog signals, and other descriptive information such as program content. Receivers 26 tuned to the transmitting FM station accordingly are enabled to identify the analog signal 137 and provide appropriate processing for it.

Next, control data fields 140 and 142 provide control data for another analog signal 144 like the control data provided for the analog signal 137 by the fields 139 and 138. Similarly, additional data fields (not specifically shown) provide like control data for each additional analog signal through an analog signal K.

In summary, the control data packet or "channel" 133 defines the insertion point in each frame for each analog "channel" and for the digital data "channel" and thereby facilitates separation of channels in system receivers.

With reference again to FIG. 3B, the control packet 133 is ended with a 16 bit check word 146 that provides a mechanism for the receivers 26 to verify that a valid control packet has been received and thereby to validate synchronization. Data packets #1 through #P designated by reference characters 150, 152, 154, and 156 are transmitted after the control data packet 133 in the time frame 130.

Each data packet starts with a 16 bit coded length word 158 that defines the byte length of a data field 164 in the data packet. A rate one-half code is applied to the length field because a loss of the length field would cause a loss of the rest of the data in the frame. Thus, the byte length is L2 for the data packet 150 and the byte length is L3 for the data packet 152. An 8 bit customer identification byte 160 and a 16 bit unit number word 162 identify the particular customer and the customer's particular receiver 27 to which the data packet is addressed. For example, if the customer is a paging company, the unit number specifies a particular portable paging unit.

Generally, data packets are collected and organized for transmission in successive time frames under the control of frame control computer programming. Data packets for different customers may be intermixed in each transmitting time frame, or alternately data packets for the same customer may be assembled as a group of serial packets in the same time frame. The amount of data sent by each customer can vary in any fashion from frame to frame, as long as the total amount of input from all customers does not consistently exceed the digital capacity of the network channel.

Usually, the data packets #1 through #P assembled in each time frame will use all but a few of the available time ticks. Any remaining time ticks at the end of the digital data section of the time frame 130 are filled with zeroes as indicated by the reference character 158 to mark the end of digital data transmission in the time frame 130. A frame timepoint 141 accordingly marks both the end of digital data transmission and the start of allocated frame time for analog signals.

Digital data may be packetized into independent data packets at the central location or at the station location in accordance with any of various schemes which may reflect user specifications. Each packet may be limited to data from a single user. Further, data packets from different users may be intermixed in the course of transmission processing, and, if so, are properly separated after reception.

Figure 4A:
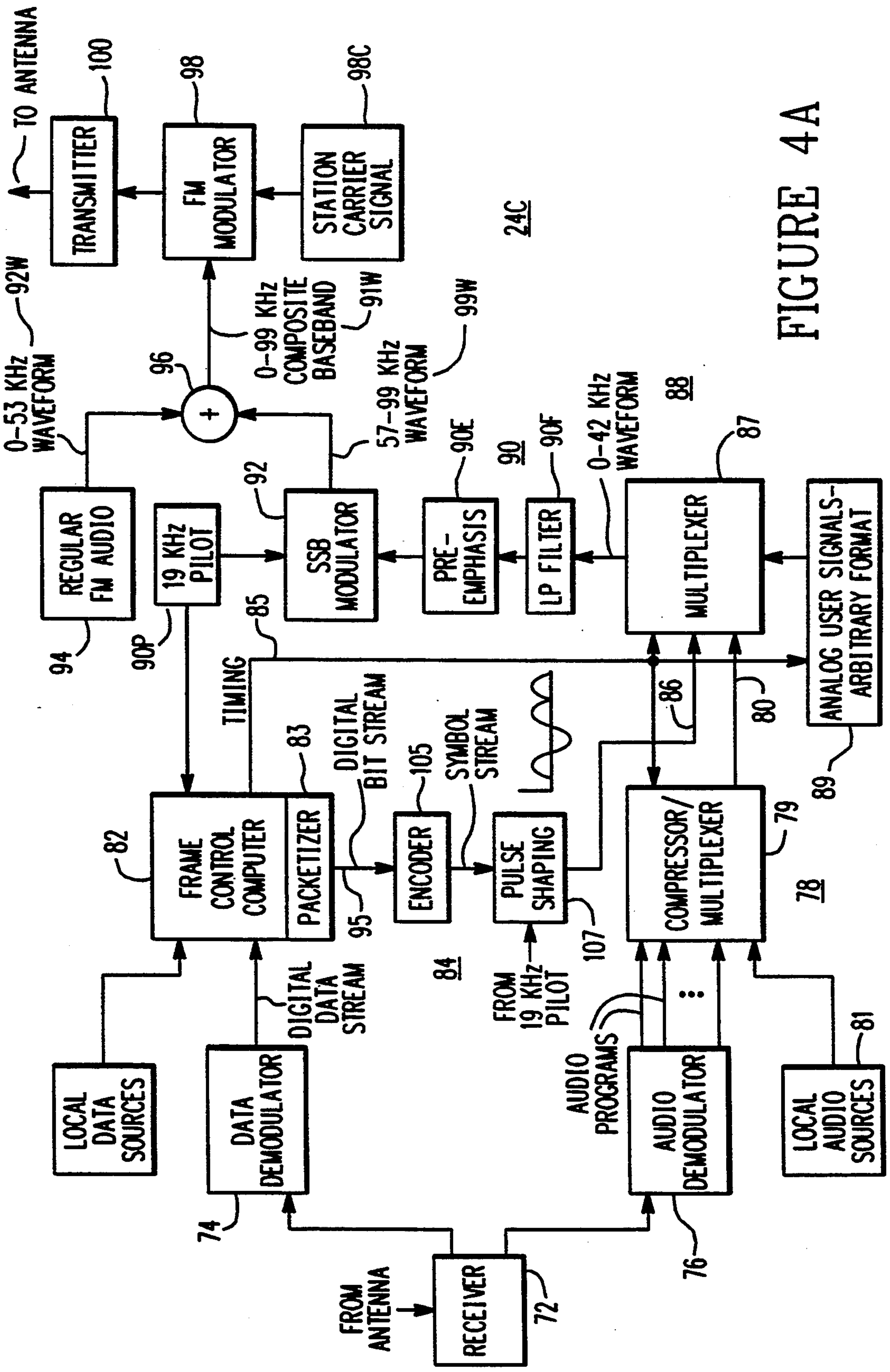
FIG. 4A illustrates an even more detailed functional block diagram for each of multiple regional FM stations employed in the system of FIG. 1.

Station FM Radio Transmitting Subsystem for Wide Band FM-SCA Radio System—Greater Detail The FM-SCA station circuitry 26C of FIG. 3A is shown with greater block diagram detail in FIG. 4A. Like reference characters are used in the FIGS. 3A and 4A for like blocks.

As shown, various audio program signals are applied from the audio demodulator to the signal processor/-combiner which is preferably provided in the form of a compressor/multiplexer 79. Signals from local audio sources 81 can also be applied to the input of the compressor/multiplexer.

Figure 4B:
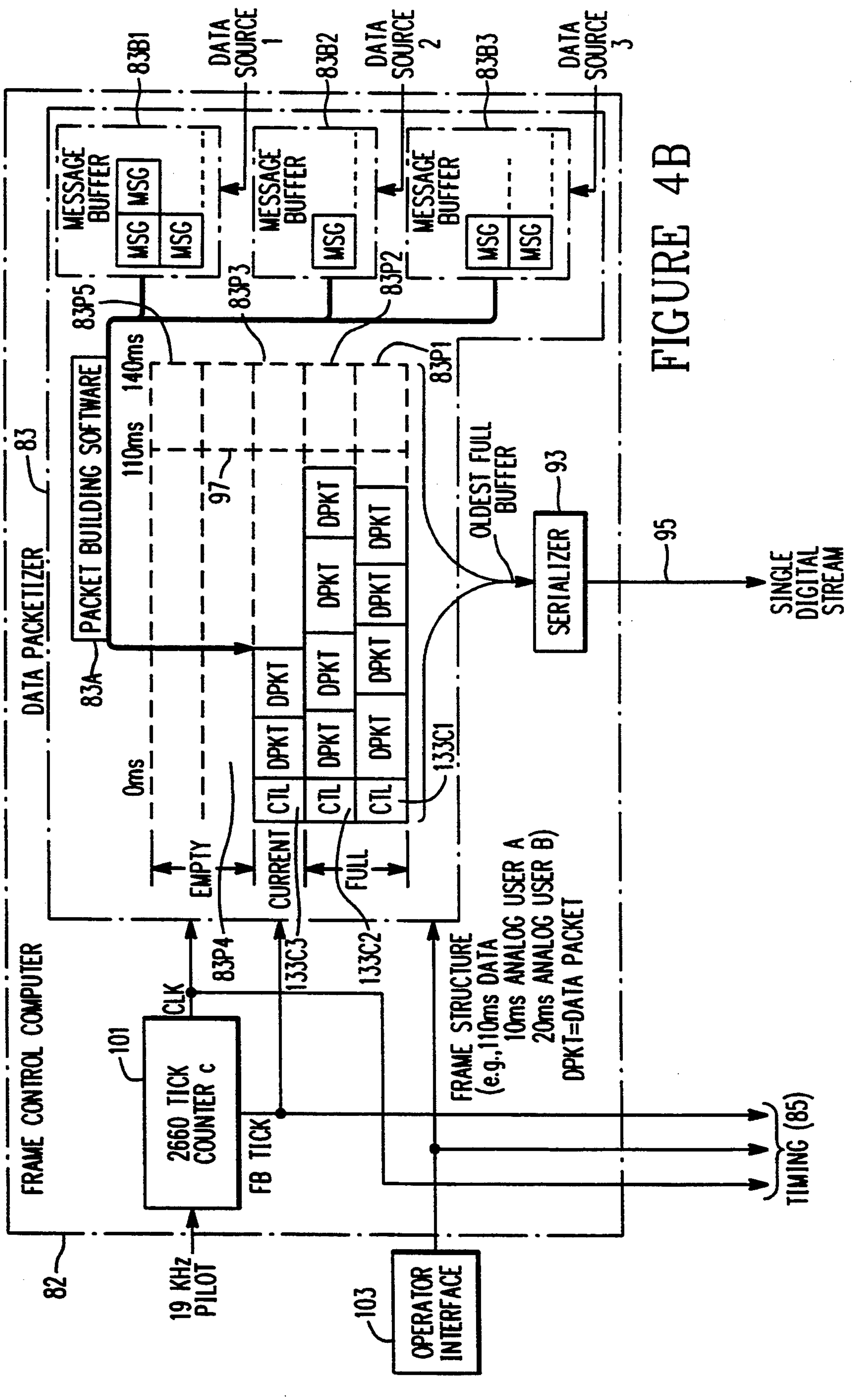
FIG. 4B shows a frame control computer employed in the station circuitry of FIG. 4A.
Figure 4C:
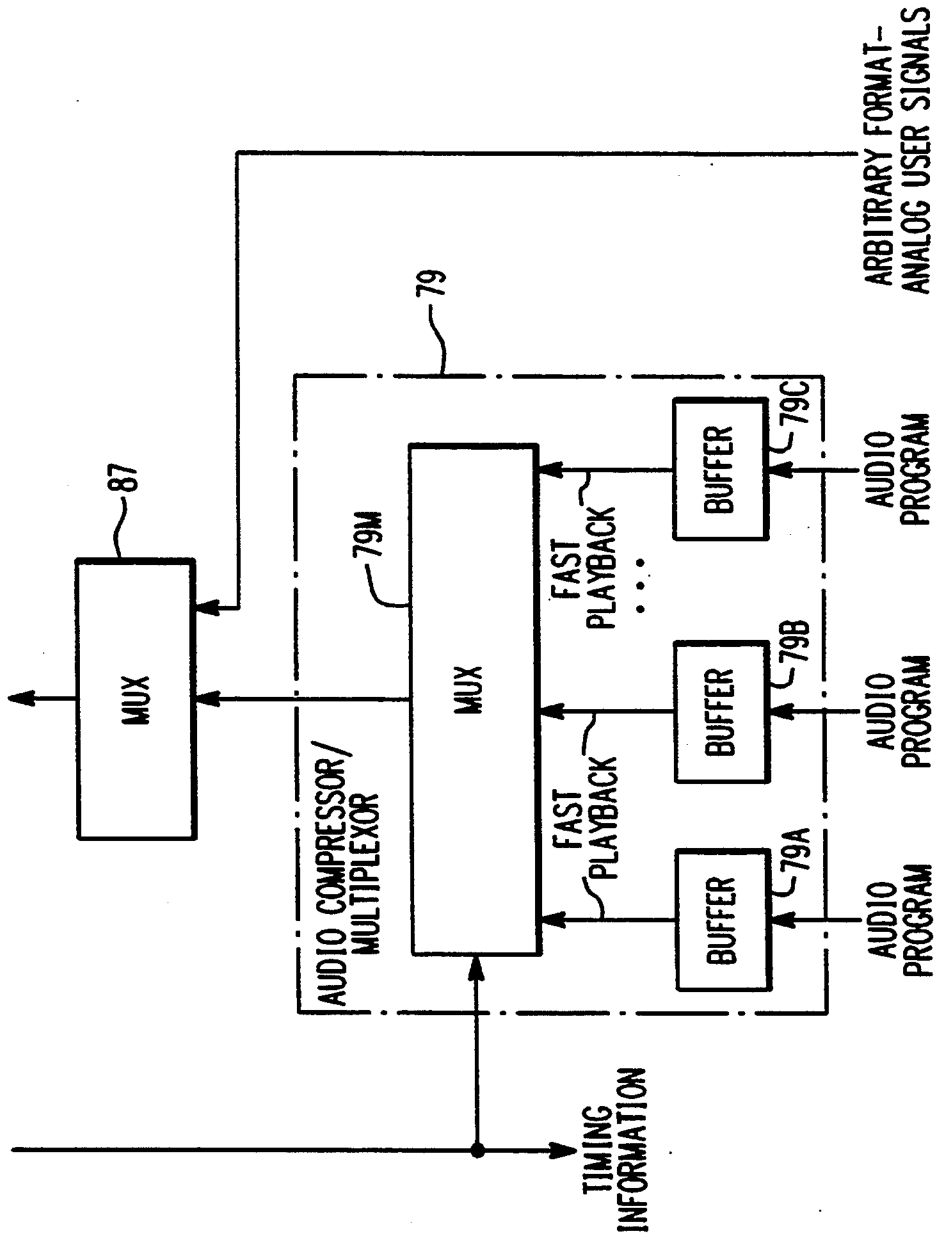
FIG. 4C provides greater functional block detail for multiplexing circuitry employed in the station circuitry of FIG. 4A.

Preferably, the audio signals are time compressed and time multiplexed by the compression/multiplexer 79 as more fully considered in the previously referenced co-pending patent application and as further considered herein in connection with FIG. 4C. Generally, frequency division is currently in wide use for SCA signals and is the basis by which the stereo components of the basic FM signal are multiplexed. However, frequency multi-plexing suffers from several disadvantages. The electrically tunable filters required to permit accessing an arbitrary portion of the SCA bandwidth are less amenable to large scale integration than are the equivalent circuits with time division multiplexing.

In a system carrying only audio traffic, frequency multiplexing is moderately less efficient than time multiplexing in the use of available bandwidth. This is because frequency multiplexing relies on separation by filters and the practical characteristics of such filters necessitate that guard bands be placed between spectra of adjacent signals. In contrast, two time-multiplexed signals can be placed in quite close proximity, thereby minimizing any wasted transmission resource. A reasonable estimate for frequency guard space is 25% whereas for time separation it is 5%.

In an FM demodulator (usually referred to as a discriminator) an inescapable consequence of its operation is that the noise power is greater at high output frequencies than for low frequency. In a wide band FM-SCA radio system, signals are situated in the higher half of the composite baseband and, hence, are subject to greater noise effects. Moreover, the high end of the SCA bandwidth (99 KHz) is subject to greater noise than the low end (53 KHz). In fact, the receiver noise power is proportional to the square of the frequency so that the high end is exposed to four times the noise power (for a given small bandwidth) compared to the low end. The net effect of this for frequency multiplexing is that there is an unequal quality of service among audio subchannels.

Because of the multiplicity of signals comprising a frequency divided system, there are more opportunities for interaction among the signals as their composite traverses various non-linearities in the transmitter and, subsequently, the receiver. The net effect is a phenomenon known as intermodulation. While intermodulation can be kept small with careful design, the reality of the wide band FM-SCA application is that the FM static transmitters are in place and their characteristics must be accepted as is. Hence, a multiplexing method with a small number of constituent signals has an advantage so that time multiplexing (for which a single wide band FM-SCA signal is present at all times) is preferred.

A related drawback to frequency multiplexing is that with a large number of signals it is harder to control the combined deviation that is caused by the instantaneous sum of many constituent signals. It is a fact that the peak-to-standard-deviation ratio for the sum of many signals tends to grow as the square root of the number of signals. Thus, to avoid excess deviation it may be required to keep the average composite signal level low with frequency multiplexed audio subchannels.

In any case, in a system with data traffic, time division provides a highly divisible channel in which many users may access the channel infrequently, possibly with paging or other short messages. Such use is not amenable to frequency division even with demand-assigned frequency slots due to its highly dynamic nature.

As generally shown in FIG. 4C, time compression of the input analog signals is produced by applying respective audio program analog signals to respective buffers 79A, 79B, and 79C. The buffered audio signals are played back at a fast rate to time-compress the audio signals prior to application to a multiplexer 79M. As shown, analog user signals having an arbitrary format :bypass the time compression process.

An output signal 80 from the compressed multiplexer 79 is applied (FIG. 4A) along with a digital data signal 86 as inputs to a signal combiner 88 which is preferably in the form of a time multiplexer 87. Any additional local analog user signals 89 having an arbitrary format are also applied directly as inputs to the multiplexer 87.

The local analog signals 89 may be any kind of analog signal that a local user may have need to transmit over the station area of coverage. The arbitrary format signals 89 may be any analog signal band limited to 42 KHz which may access the channel on a time divided basis.

The total frame time burden of the local audio sources 81, local analog user signals 89, and network audio program signals 76 is normally equal to the portion of the frame time allocated to analog service. The remaining portion of the frame time is then available for digital data transmission.

With respect to the processing of digital data for retransmission by the FM station, a digital data stream is coupled from the output of the data demodulator 74 to the frame control computer 82. A programmed packetizing procedure 83 is executed by the frame computer 82 to organize the digital data into data packets, such as the data packets 152–156 of FIG. 3B.

The frame computer 82 organizes the control data packet and the data packets into the frame signal structure previously described, and further provides frame timing control so that each digital packet and each analog signal to be joined into the time frame is injected at its proper time. Timing control of external multiplexer circuitry is implemented through signal line 85.

More particularly, as shown in FIG. 4B, the data packetizer 83 includes a message buffer 83B for each input data source. Three data sources are shown coupled to three message buffers 83B1, 83B2, and 83B3 for illustrative purposes. Each message buffer stores incoming messages from the central network source or from local data sources on arrival.

Messages are transferred from the message buffers to data packet buffers 83P, with five such packet buffers 83P1 through 83P5 shown for illustrative purposes. Message transfer and organization with control data into framed data packets is logically performed under the control of packet building software 83A.

As shown in FIG. 4B, basic timing for computer frame control is obtained from the 19 KHz pilot signal. The 19,000 cycles-per-second pilot signal drives a counter 101 to generate 2660 clock ticks in each 140 millisecond time frame. The clock ticks are applied to the data packetizer 83 and externally to the multiplexers as previously described to provide signal timing within the time frame.

Successive FB clock ticks mark the frame boundaries between successive frames and are applied to the data packetizer 83 and externally to the multiplexers for software and circuit control in the processing of data frames. An operator interface 103 provides a signal to the data packetizer 83 and the external multiplexers for the purpose of defining the composition of the frame with respect to digital data and analog uses.

Generally, after a leading control data packet 133C is structured and placed, successive messages obtained from the message buffers are appended with proper address and length fields and placed as successive end-to-end data packets (DPKTs in FIG. 4B) in a current one of the packet buffers (the buffer 83P3 in the illustrated case) until that buffer is filled or nearly filled. Subsequent messages are formed into data packets that are placed in the next packet buffer (the buffer 83P4 in the illustrated case) until it is filled.

If, for example, the FM station is employing 30 milliseconds of frame time for analog signals, as provided in FIG. 4B by the frame space to the right of reference line 97, a message frame is full if control data and digital message data stored in a packet buffer corresponds to 110 milliseconds of frame time at a symbol generation rate of 5320 symbols per second. The remaining frame time, i.e. the difference between the design time frame of 140 milliseconds and the 110 milliseconds allocated for control and digital data, is allocated for the station analog signal time, i.e. 10 milliseconds for an FM-SCA network talk show signal for user A and 20 milliseconds for an FM-SCA network music signal of medium quality for user B. In the preferred embodiment, control data may occupy about 5 milliseconds of frame time, so that 105 milliseconds of frame time would be available for digital data transmission in this station signal allocation example.

Normally, data packets sequentially accumulated in a packet buffer will not exactly total to the available buffer space corresponding to the 110 millisecond control and digital data time allocation. As shown for the buffers 83P1 and 83P2, the unused current buffer space left after placing the maximum number of serially received messages into the current buffer is filled with zeroes and the current buffer is considered substantially full.

The control data and the data content of filled packet buffers is output to a serializer 93 to produce a single stream of digital output bits as indicated by the reference character 95.

Figure 4D:
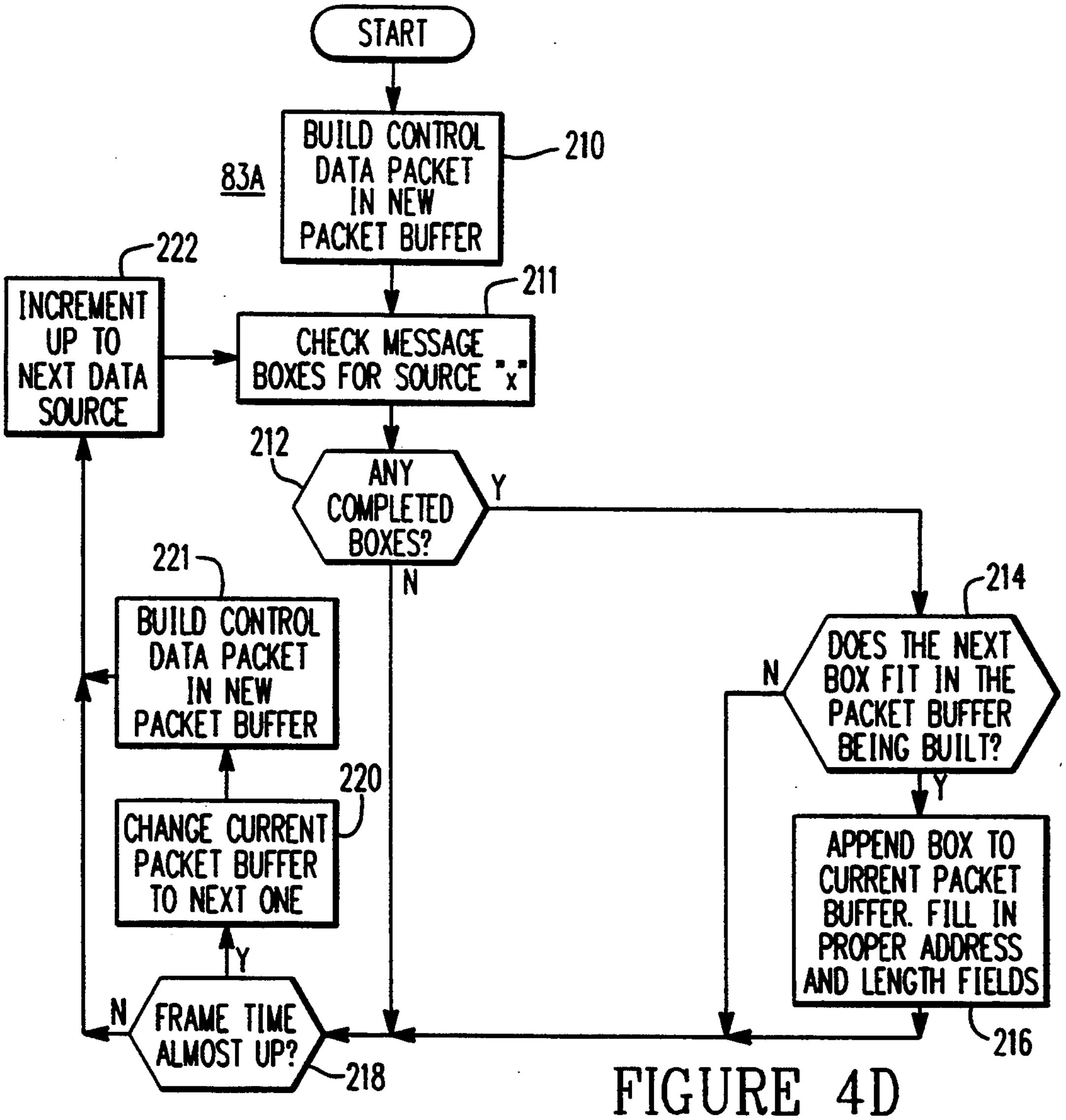
FIG. 4D is a flow chart representing programmed procedures executed in the frame computer for data packetizing.
Figure 4E:
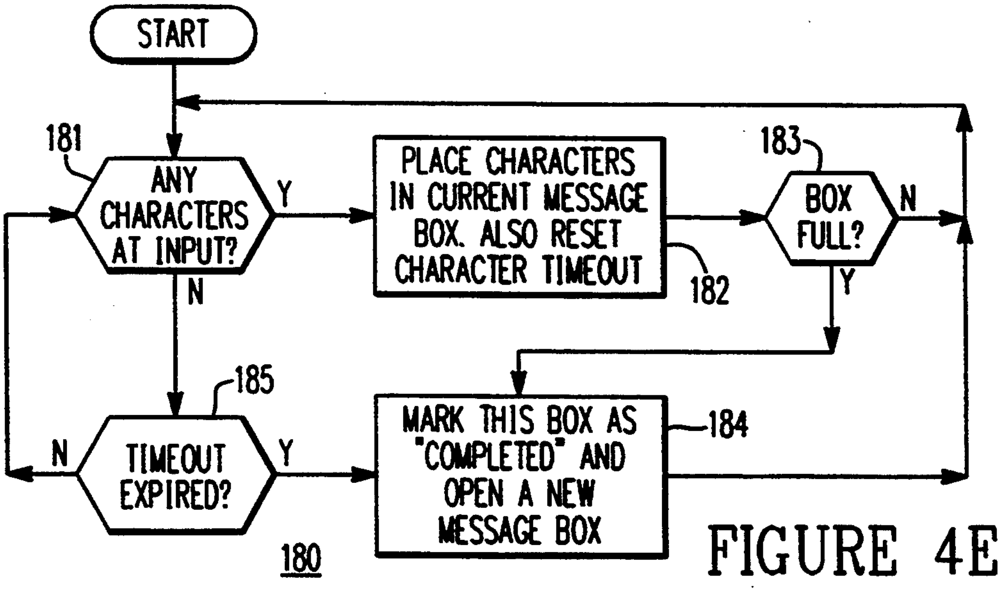
FIGS. 4E, 4F, and 4G show flow charts for the operation of a message buffer respectively in a TDM stream mode and a message mode in the frame computer.
Figure 4F:
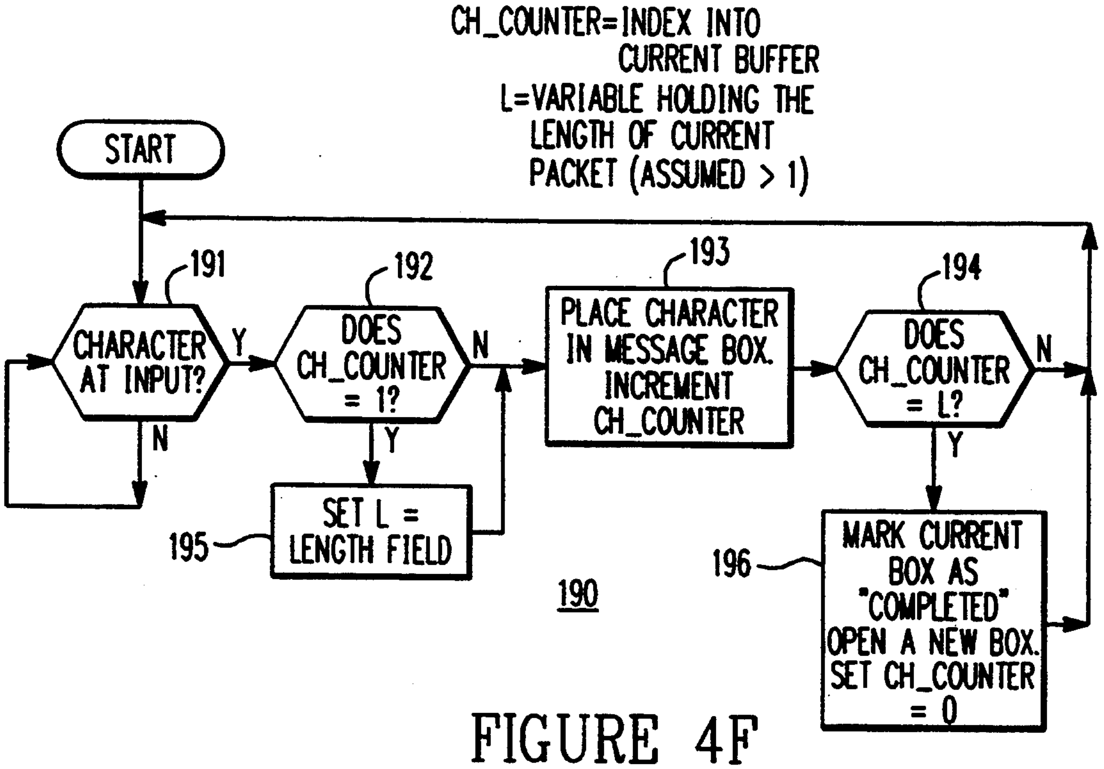
Figure 4G:
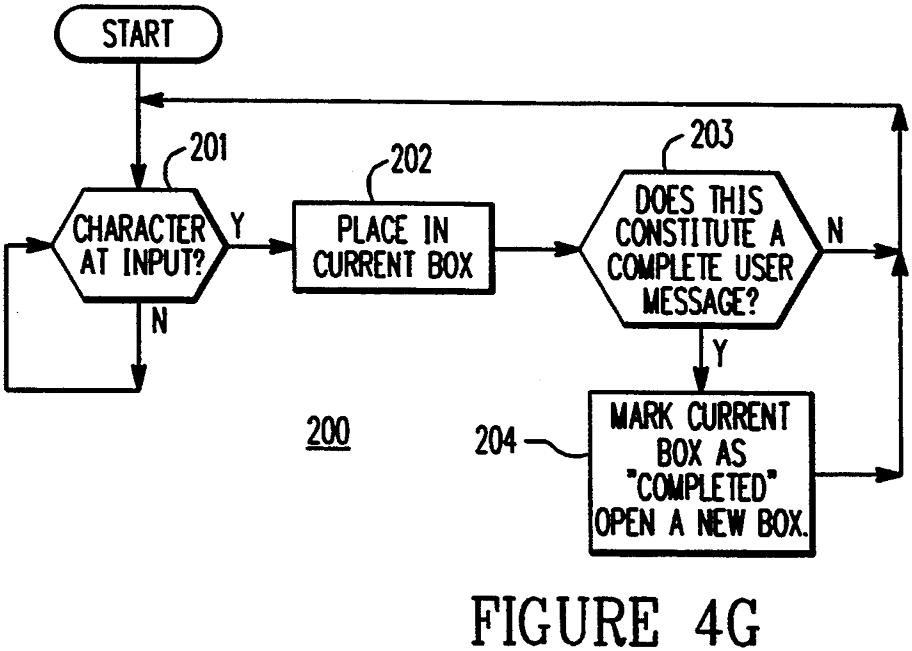

In FIGS. 4E, 4F, and 4G, there are shown three different illustrative programmed procedures 180, 190, and 200 that can be employed for controlling the message buffers 83B1, 83B2 and 83B3 under differing circumstances. Many other programmed procedures can be employed for message buffer control under these circumstances or under any of many other circumstances.

The programmed procedure 180 operates in a transparent mode and is especially useful where no information about the data source is made available to the wide band FM-SCA radio system. As shown, a test block 181 first determines whether any input characters have been received.

If so, a block 182 places the characters in a current message box and a character timeout is reset. If a test block 183 shows the current message box is full, a block 184 marks the current message box "completed" and a new message box is opened for storage of incoming characters.

If the test block 181 indicates no input characters, another test block 185 makes a timeout check. If the timeout has not expired, a return is made to the block 180. With expiration of the timeout, the programmed procedure flows to the block 184 for message box completion as previously described.

In the transparent mode, bytes are collected until a message box is filled and the bytes are then ready for shipment for data packetizing. In this case, the user receiver is required to interpret the transmitted data. If no activity occurs on the input line for a predetermined timeout period, such as one second, the current message box is sent even though it is not full. This procedure prevents data from being left at the frame control computer 82 for what is considered to be too long a waiting time for a message box to be filled.

The programmed procedure 190 operates where the data source provides data packets having the correct maximum length. This can be the case where the data source is the data stream obtained from the network satellite signal. Data packets of correct length can be placed directly in message boxes from which data packets are formed for FM-SCA transmission by the station. Headers may have different formats in the satellite link and the FM-SCA link and appropriate message buffer logic can be used to interface the header difference. Otherwise, the time division multiplexed satellite data packets can correspond one-to-one to the FM-SCA data packets.

As shown in FIG. 4F, a test block 191 first checks for input characters. Next, a test block 192 determines whether a character counter equals 1. If it does, both bytes of the length field have been received and a block 195 stores the decoded length in a register L. In any case, a block 193 places the current character in the current message box and increments the character counter.

Another test block 194 then detects whether the character counter, CH counter, equals the register L. If it does, a block 196 marks the current message box as "completed", opens a new message box, and sets the character counter equal to zero.

The last illustrative message buffer control example is shown in FIG. 4G and is operative in a "message mode". In the message mode, the frame control computer 83 has information about the data source, i.e. information as to at constitutes a complete message for that data source.

The procedure 200 also starts with a test by a block 201 for a character input. When a character is received, it is placed in the current message box by a block 202.

A test block 203 then determines whether the last character completes a user message under standards supplied to the system by the user. If not, a return is made for the next character.

If a complete message is detected by the block 203, a block 204 then marks the current message box as "completed" and a new message box is opened. More generally, the procedure 200 can be used in any case where complete-message standards are defined to the system. The standards are applied by the block 203 whatever the source of the standards may be.

As shown for the packet building software 83A in FIG. 4D, after startup a block 210 builds a control data packet in the first buffer. The control data packet is built directly from information entered by the operator (see block 103 in FIG. 4). A block 211 next checks the message boxes in a first data source "x" and a block 212 determines whether any completed message box is available for packetizing.

Next, if a message is ready for packetizing, a test block 214 determines whether the ready message box fits in the packet buffer being built. If so, the message box is formatted with the proper address and length fields and then appended to the current packet buffer.

In any case, a check is made in test block 218 to determine whether digital data frame time is almost expired in accordance with a predetermined time measure. If not, a block 222 increments to the next data source (i.e., $x=x+1$) and a return is made to the block 210 for a repeat execution of the procedure 83A.

If the frame time is determined to be almost expired, a block 220 advances from the current packet buffer 83P3 to the next empty packet buffer 83P4. A block 221 then builds a control data packet in the, new current packet buffer 83P4 and the procedure flows to the block 222 and is continued as previously described.

With reference again to FIG. 4A the digital data stream is applied to an encoder 105 that employs a suitable encoding procedure to decrease the probability of error. The encoder output is a digital symbol stream that is applied to a pulse shaping circuit 107 that is clocked by the 19 KHz pilot. The pulse shaping circuit 107 converts the symbol data into a waveform (such as the illustrated waveform) for transmission. The shaped pulse output from the block 107 is the digital signal 86 applied as an input to the multiplexer 87. The illustrated pulse shape exemplifies a relatively simple, half cosine period shape in the time domain. More complex pulse shapes, such as raised cosine spectrum pulses, may be employed to achieve superior performance.

The output waveform from the multiplexer 87 is an SCA-bond baseband waveform having a frequency range of 0–42KHz and containing the combined digital and audio input signals 80, 86, and 89. The signal processor 90 preferably includes a low pass filter 90F and a pre-emphasis circuit 90E that is needed to compensate for subsequent de-emphasis.

The output from the pre-emphasis circuit 90E is applied to the single sideband modulator 92 for amplitude modulation onto the 3rd harmonic (57 KHz) of the 19 KHz pilot signal obtained from block 90P. The modulated output is the SCA-bond waveform 99W (see FIG. 4A and 3D) having a frequency range of 57–99 KHz.

As previously noted, the adder 96 combines the regular FM audio baseband 92W (0–53 KHz frequency range) and the SCA-bond 99W to generate the composite baseband 91W (0–99 KHz frequency range). As shown in FIG. 3D, the composite baseband 91W includes the regular FM audio baseband 92W and the SCA-bond 99W. In turn, the regular FM audio baseband 92W includes the upper and lower storer sidebands 95W and 97W and the 19 KHz pilot signal 93W. Normally, the pilot signal 93W would have about a 10% injection value.

FM Receiver Subsystem for Receiving Transmitted Station Signals in Wide Band FM-SCA Radio System—Greater Detail Generally, the wide band FM-SCA receiver is a basic FM receiver that has been originated for SCA reception. To a user, the receiver appears to be the same as any other consumer FM radio except that the user interface has additional provisions to select between the basic FM and the wide band FM-SCA programming material.

The FM-SCA receiver circuitry 26C shown in FIG. 3A is shown in greater block detail in FIGS. 5A1 and 5A2. Like reference characters are employed in FIGS. 3A, 5A1, and 5A2 for like elements. The receiver circuitry 26C is embodied with conventional FM radio receiver circuits that has circuit and user interface modifications needed for implementation of the invention.

In FIG. 5A2, the discriminator 108 (in this case, a portion of the regular FM receiver circuitry) processes the received station signal and produces a demodulated output that is applied to a low pass filter which passes the waveform of the regular FM audio baseband portion of the composite baseband to de-emphasis and separation circuitry. De-emphasis is performed to compensate for the uneven noise spectrum typically output from an FM discriminator. Separation processing produces left and right stereo signals that are applied to a speaker 234.

The discriminator output is also applied to a phaselock loop 236 that is tuned to the 19 KHz pilot and generates the pilot signal at its output. The pilot signal is used in a digital receiver circuit 248 and the SSB demodulator 112 as a basis for circuit timing.

Reception of FM-SCA digital data and audio signals is enabled by applying the discriminator output to the single sideband demodulator. The SSB demodulated output is the original FM-SCA baseband waveform and it is applied to a de-emphasis circuit 238.

Under timing control from control packet logic 240, the FM-SCA audio signals are applied from the deemphasized SCA-bond waveform to the analog waveform receiver 114.

Time compressed audio signals are processed through the expander 114 which is part of an analog waveform receiver 242. Generally, the expander 114 includes a buffer 244 which stores the incoming time compressed audio signals under timing control from the control logic 240 as indicated by the reference character 246. Expander circuitry releases the stored audio signal for output from the buffer 244 at a slow playback rate which corresponds to normal time.

A user interface 340 gives selection information to the analog receiver 242 which selects at most one of the compressed analog signals for playback. In addition, selection information commands the multiplexer 342 to route either the regular FM program or the selected FM-SCA program to the speakers.

Analog signals which had not been time compressed prior to transmission are passed through the receiver 242 under timing control 246 for application to whatever user receiving device (not shown) is needed for the particular analog signal being received.

The pass-through output may be active simultaneously with the data and audio outputs. The selection of one or more of the uncompressed analog signals for output may be controlled by the selection information from the user interface 340.

The deemphasized FM-SCA waveform is applied to a digital receiver 248 for processing of transmitted digital data. Thus, the digital receiver 248 converts the received signal into a symbol stream.

The output of the digital receiver 248 is a symbol stream as encoded prior to transmission. Accordingly, the encoded symbol stream is applied to a decoder 250 which generates a decoded bit stream at its output. The decoded bit stream is applied to a frame parsing computer 252 and logic circuitry 254 that searches for frame boundaries that are needed to synchronize the processing of received digital data packets.

The frame search logic circuitry 254 searches for the unique word 134 and verifies the correctness of the check word 146 at the end of the control packet to ensure proper synchronization. Frame boundary signals are generated by the search logic 254 in response to the unique word and the pilot tone to function as output synchronizing signals.

The frame parsing computer 252 employs the frame boundary signals to facilitate the division of the input decoded bit stream into framed data packets. Packet routing logic 258 is applied to the data in a buffer 256 to detect data packets addressed to the particular receiving unit 26C in which it is received. Other message data packets are discarded as indicated by a trash box 260.

Figure 5B:
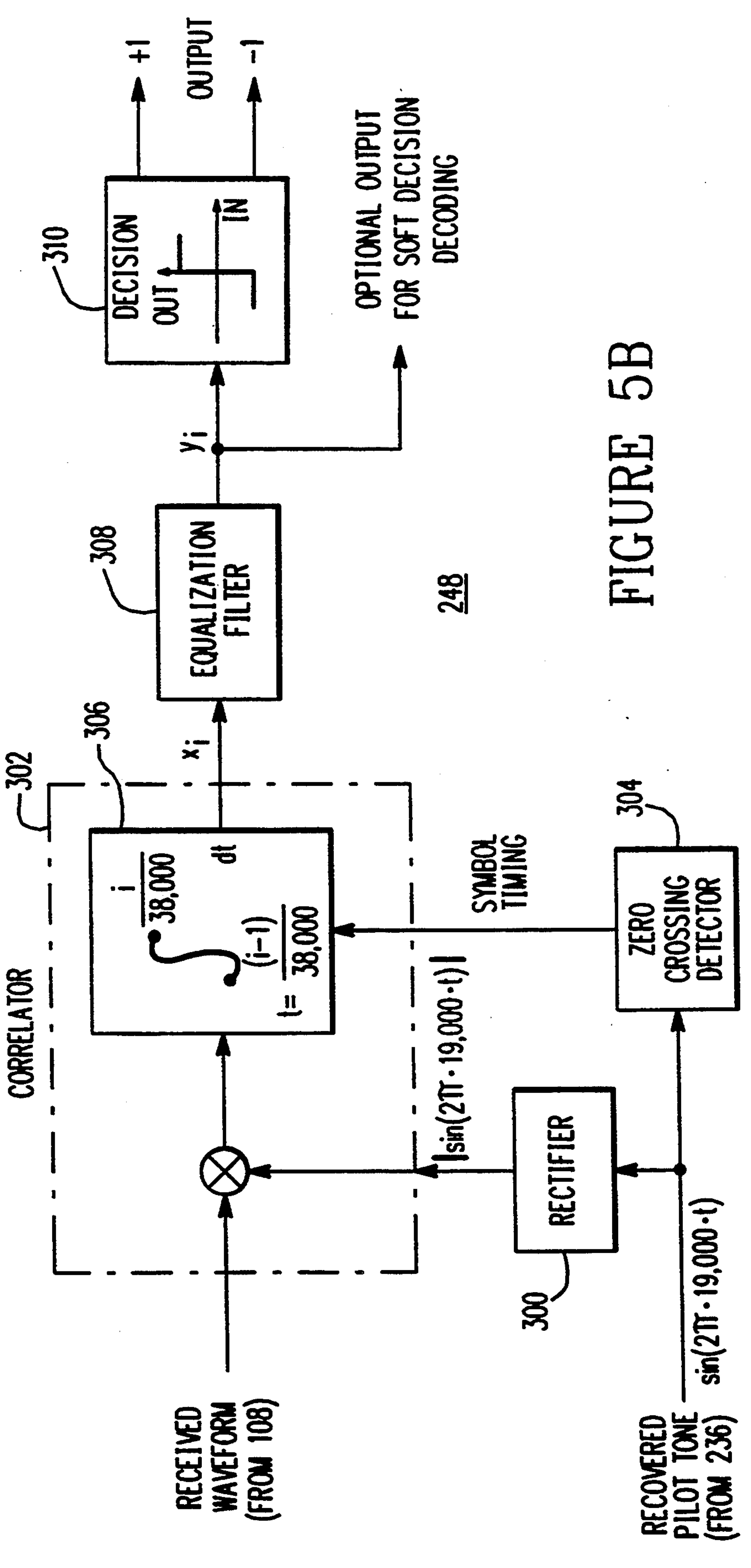
FIG. 5B shows digital receiver circuitry employed in the FM receiver of FIGS. 5A1 and 5A2.
Figure 5C:
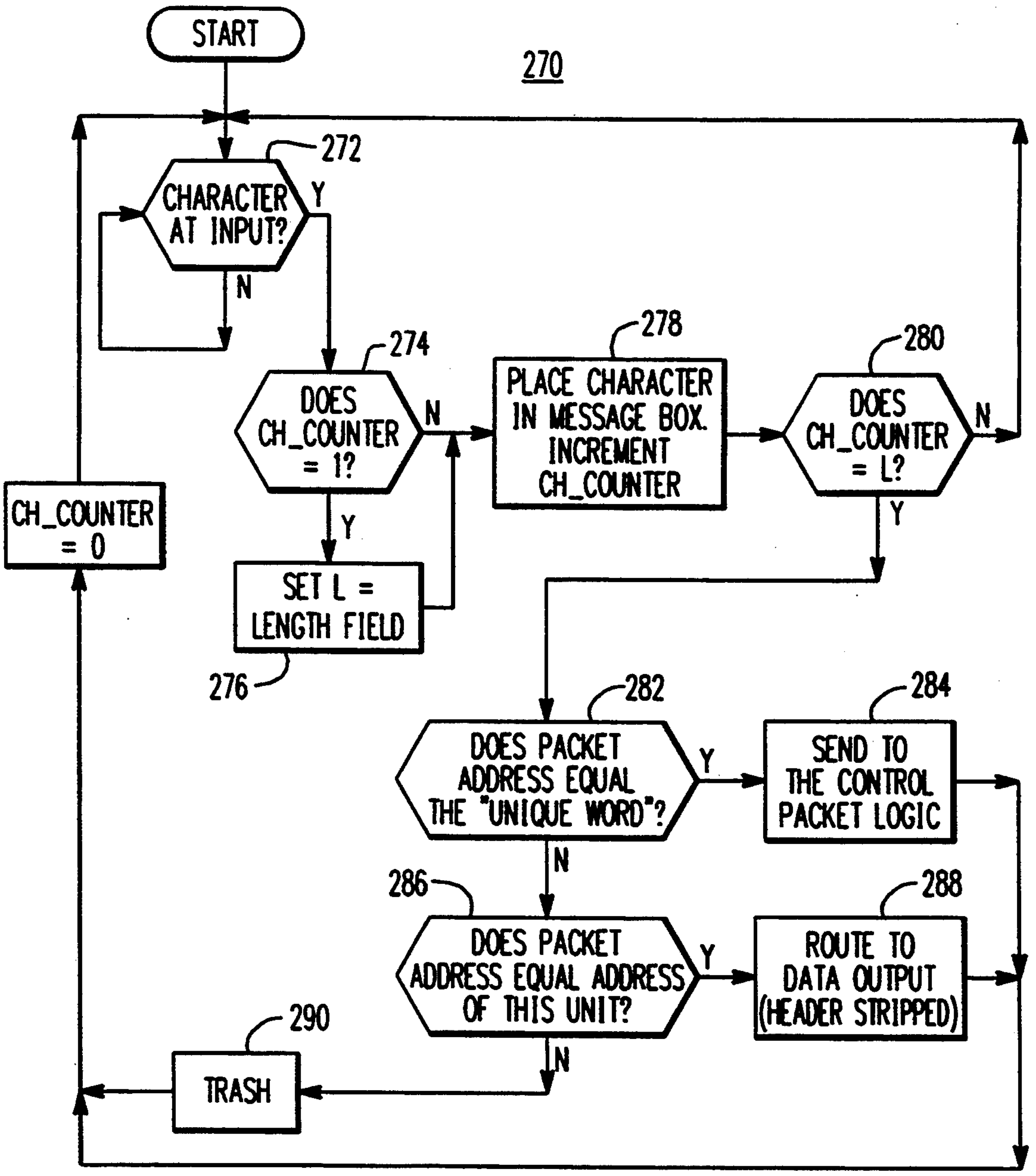
FIG. 5C is a flow chart for a programmed procedure executed in a frame parsing computer employed in the receiver of FIG. 5A.

As shown in FIG. 5C, a parsing procedure 270 tests for a character input in block 272 and then checks the character count in block 274. If the count equals 1, both bytes of the length field have been received and a block 276 stores the decoded length in the register L.

A block 278 then places the character in the message box for the current data packet and increments the character counter. Block 280 next checks the character counter to determine whether the count equals the present length field stored in register L. If the character count is short, the procedure 270 returns to the block 272 to receive the next character.

If the character counter has reached the present length field indicating that a complete packet has arrived, a block 282 determines whether the packet address is the unique word (FIG. 3B). If it is, the packet is found to be the control data packet and it is sent by block 284 to the control packet logic 240 (FIG. 5A1) for FM-SCA analog waveform reception control as previously described. Thus, the control data is read to generate the timing information 246 for controlled reception of the FM-SCA analog signals. The control data is used to generate control signals that mark the starting time and format of the analog signals.

If the packet is not a control data packet, a block 286 tests whether the packet is addressed to its receiver, and, if so, a block 288 strips the header and routes the packet to the data output 344, which may consist, for example, of an electrical connector or a character display unit. This output is active in a data equipped receiver independent of the selection information used to control the analog outputs. Other packets are trashed by block 290 and a return is made to the block 272 to process the next character input.

The signal information in the control packet (FIG. 3C), which was considered previously herein, may be used to provide substantially continuous reception of the same audio program as a receiver moves across different FM station service areas. A user may, for example, select a specific FM-SCA program or a program type; the WBS receiver will then scan for a participating station carrying that program.

If the signal from the new station becomes so weak that frame synchronization cannot be maintained in the receiver, the receiver will again initiate scanning to find another participating station carrying that program. Thus, nearly continuous reception of the same program is maintained without any manual tuning by the user.

Alternatively,, this process can be facilitated by including duplicate hardware (not shown) for a portion of the receiver, so that scanning can occur in the background without interrupting reception of the current station. In this case, the receiver can always be tuned to the strongest participation station carrying a specific program.

In the present embodiment, there is no signal information for digital data that is similar to that just described for audio signals; that is, each WBS-equipped station in a given area is assumed to carry the same data program, and there is no indication to the FM-SCA receiver which available participating station it should tune to for data packets which might be addressed to it. If a data receiver scans for any available participating station whenever it loses lock, then substantially continuous data reception is provided as a receiver moves between service areas. Alternatively, this process can be facilitated by including duplicate hardware, which, as described hereinabove, allows the FM-SCA receiver always to be tuned to the strongest available WBS-equipped station.

An FM-SCA receiver having both audio and data capability may employ a hybrid of the described schemer.

The digital receiver 248 (FIG. 5B) takes as inputs the received waveform and the recovered pilot, both from FIG. 5A2. The pilot tone is rectified by a rectifier 300. With linear phase across the channel, the rectified pilot tone has a pulse shape that is synchronous with the received waveform. A correlator 302 correlates the pulse shape, with the received waveform over intervals of a symbol duration.

Integration start and stop times are provided to the integrator 306 by a zero crossing detector 304.

The correlator 302 outputs a discrete statistic $x_i$ each symbol time that is passed through an FIR equalization filter 308 (if necessary) which outputs the final symbol statistics $y_i$. Hard symbol decisions are made in a threshold detector 310, in which case the decoder 250 operates on a binary symbol stream. Alternatively, the symbol statistics $y_i$ can be passed directly to the decoder for soft decision decoding.

Figure 6:
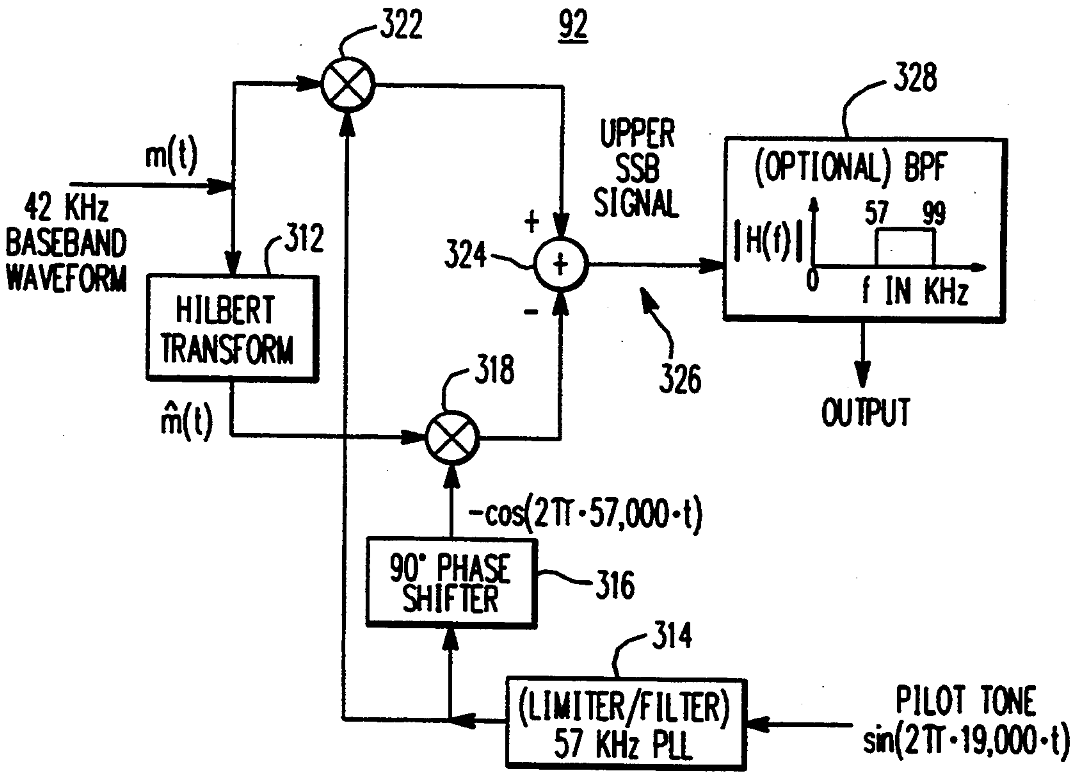
FIG. 6 shows a schematic diagram for a single sideband modulator employed in the station circuitry of FIG. 4A.

FIG. 6 illustrates the operation of the SSB modulator 92. An input m(t), which is a baseband waveform with energy up to 42 KHz, is passed through a Hilbert transformer 312 to yield m(t). A 57 KHz sinusoid, synchronous with the pilot, is generated in a 57 KHz phase locked loop 314, which may be implemented as a simple limiter/filter. This process is assumed to generate no phase shift so that zero crossings of the 19 KHz pilot coincide with zero crossings of the 57 KHz limiter/filter output.

A 90° phase shifter 316 provides a sinusoid in quadrature. Mixers 318 and 322 and a summer 324 combine these elements to implement an upper SSB phase-shift modulator. The output 326 may be filtered by a bandpass filter 328 to suppress any out-of-band emissions created by imperfections in the previous steps, in preparation for creation of the final baseband signal by a summer 96.

Figure 7:
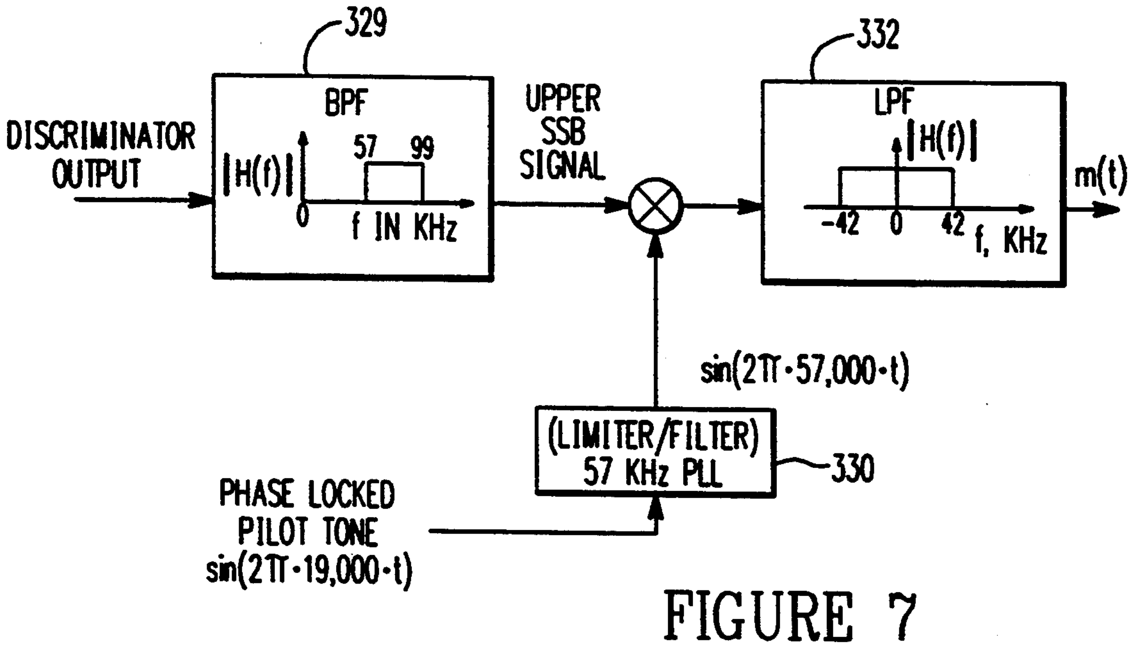
FIG. 7 shows a schematic diagram for a single sideband demodulator employed in the receiver circuitry of FIG. 5A.

FIG. 7 illustrates the operation of the SSB demodulator 112. The FM discriminator output is first passed through a bandpass filter 329 to isolate the SCA signal. A 57 KHz sinusoid synchronous with the pilot tone is generated by passing the recovered pilot through a phase locked loop 330 that operates like the phase locked loop 314. With linear phase across the channel, a phase coherent carrier is accordingly provided for demodulation. The carrier is multiplied by the upper SSB waveform, and the result is passed through a lowpass filter 332 to eliminate the spectral image appearing above 114 KHz (twice the carrier frequency). The resulting output is the original 42 KHz baseband waveform.

Advantages of the Invention

In operation, the present invention employs essentially the entire SCA band to transmit a single signal which is time divided to enable each of multiple users to have limited time access for the transmission of digital data or analog wavebands. This operation and the system structure that underlies it provide economic feasibility for networking of SCA transmission with extensive digital data and analog waveform capacity.

With the spectrally efficient application of single sideband modulation to the SCA digital/analog baseband signal, spectral efficiency is doubled as compared to double sideband modulation. Further, with the, application of time multiplexing, extensive demand divisibility is provided for signal transmission. This means that many low rate users can access the channel easily and economically.

When an FM-SCA radio network embodying the present invention is used to provide wide area data communication, the distribution costs for providers of data services and other users are dramatically reduced. Network use charges can be based on network usage time in accordance with the present invention as opposed to the much higher station cost for full time access to a dedicated station channel in the prior art.

Furthermore, use of the present invention to provide network data communications provides generally facilitated distribution and significantly reduced administrative costs for data service and other network data users. Conventionally, each user, who desires to obtain wide area data communication, must negotiate with FM stations station-by-station to obtain access leases for use of an SCA frequency in each station area and to provide for rental payments station-by-station over the usage period. Contract burdens of this type are costly and time consuming to the parties involved and, overall, represent an inefficient way to achieve wide area data communication services.

More efficiently, the present invention enables the owner of the FM-SCA radio network to negotiate with FM stations for participation in the network and thereby essentially limit contracting overhead cost to that resulting from a one-time centrally executed effort. Users then negotiate directly with the network owner. As already indicated, network charges can then be based on network usage time and accordingly are much less costly especially to low-volume and/or low frequency users. Moreover, each network user need only make a single central rent payment in contrast to the multiple station rent payments necessitated in the prior art.

In addition to the foregoing advantages gained through use of the present invention, an FM station participating in an FM-SCA radio network structured in accordance with the present invention can realize reduced capital costs for transmitting equipment. Thus, electronic equipment needed for station participation may be supplied by the network owner with the equipment costs offset over time against station revenues from the network.

The user also gains advantages from implementation of the invention. Thus, a user who has a receiver in a car can move from one station transmitting region to another station transmitting region while holding substantially continuous reception of digital data or a selected FM-SCA audio channel. Further, a user can receive digital data and/or analog signals through a mobile receiver over a wide or national reception area as the receiver moves across different station transmitting areas. The transmitted data can be downloaded, for example, to a fax machine or a modem in a portable computer.

The invention is especially advantageous when applied to specific uses as follows.

Paging companies transmit signals using one of two primary methods: on a licensed paging frequency, or on FM-SCA. The paging signal is transmitted, for example, at 1,187.5 bits per second. Regardless of the method used, substantial capital and ongoing costs are incurred and transmission inefficiency is experienced as indicated herein before.

The described wide band FM-SCA data communications technology offers two major advantages to paging. First, the paging company can share the capital and ongoing costs among many different users of the system, and accordingly only pay for the portion of the system capacity it actually uses. Second, the wide band FM-SCA system has significantly greater capacity to transmit data, thereby enabling reduced delays. Third, the network cost per transmitted bit is significantly lower than that of prior art systems.

Generally, nationwide paging has grown rapidly in recent years. The national paging business combines traditional paging concepts with satellite technology to make pagers reachable throughout the country rather than only in one metropolitan area. The wide band FM-SCA data communication technology can be applied in this instance as well.

Paging signals can be sent to a central point for uplink to a satellite transponder. Wide-area FM-SCA equipped FM stations throughout the nation can receive the satellite signals for retransmission. Since the signals can be addressed to one specific receiver, the page will be received so long as the paging customer is within range of an FM station equipped with wide band FM-SCA equipment.

A wide band FM-SCA data receiver can be built into portable computers at a relatively low cost. Data can thus be downloaded to computers that do not have access to a telephone or that are enroute. This application is valuable to organizations for distributing inventory information, transmitting detailed work orders, etc.

The cellular telephone industry has spent considerable energy developing ways to make "roaming" more convenient. Currently, if a caller does not know the location of the cellular telephone he or she is calling, the call will not go through. With use of the wide band FM-SCA data communication technology, if a caller wishes to reach a cellular phone but does not know its location, the call can be routed to the network transmission center. The transmission center sends a signal to the FM-SCA receiver built into the cellular phone, requesting it to dial a number that the local cellular operator receives. The return call identifies the location of the phone, allowing the local cellular operator either to make the necessary connections automatically so that calls placed to the roaming phone go through, or to send a roaming code to the party placing the call so that he or she can redial and route the call to the proper city.

The Federal Communication Commission (FCC) has reserved certain frequencies for transmitting signals to allow for locating stolen vehicles. When the vehicle is reported stolen a hidden transmitter on the vehicle is activated by a locally transmitted high-frequency signal. The transmitter emits a signal which is tracked with a homing device by local authorities until the vehicle is found. One problem with the current systems for this purpose is how the transmitter is to be activated after the vehicle has left the metropolitan area from which it was stolen. As long as the vehicle is located in an area that is served by the wide band FM-SCA data communication system, its transmitter can be activated and located. The benefit to the locating companies is similar to paging—rather than establish the capability to send activation signals throughout the country, it simply becomes a user of the wide band FM-SCA data communication system to receive blanket coverage at a much lower cost.

Any current user of prior art FM-SCA schemes, including providers of stock quotes, background music, traffic reports, etc. can benefit from switching to the use of the wide band FM-SCA data communication system. Such users can potentially save money so long as they are willing to use receivers capable of decoding the wide, band FM-SCA signals.

Many potential uses of FM-SCA transmission are unable to support the high capital and ongoing costs associated with maintaining a traditional FM-SCA network. The low cost of participating in the wide band FM-SCA data communication system in accordance with the present invention thus will stimulate wider use of FM-SCA transmission.

The foregoing description of the preferred embodiment has been presented to illustrate the invention. It is not intended to be exhaustive or to limit the invention to the form disclosed.

In applying the invention, modifications and variations can be made by those skilled in the pertaining art without departing from the scope and spirit of the invention. It is intended that the scope of the invention be defined by the claims appended hereto, and their equivalents.

What is claimed is:

1. A wide band, wide area FM-SCA radio system for transmitting system analog and digital data signals, said system comprising:

first means for transmitting the system analog and digital data signals to participating FM stations throughout a wide geographic area;

each participating FM station having apparatus including:

means for receiving the system analog and digital data signals;

first means for demodulating and processing the received system analog signals;

second means for demodulating and processing the received system digital data signals to generate a baseband digital data waveform representing a digital data stream;

means for time multiplexing the baseband digital data waveform and at least one of the demodulated and processed system analog signals to form an intermediate waveform having a frequency range substantially corresponding to an entire legally permitted frequency bandwidth for SCA transmission;

means for generating a control signal for inclusion in the intermediate waveform to enable receiver processing of any selected system analog or digital data signal transmitted by the participating FM station;

means for combining the intermediate waveform and a regular FM baseband waveform into a composite baseband waveform;

means for FM modulating the composite baseband waveform onto a station carrier frequency signal of the participating FM station; and second means for transmitting the FM modulated signal from the participating FM station;

the control signal representing control information for the system analog and digital data signals transmitted by the participating FM station and is applied to the multiplexing means for inclusion in the intermediate waveform; and the control information further identifying the participating FM station from which the FM modulated signal is transmitted as one that is part of the FM-SCA radio system, providing indications for receiver synchronization to the time multiplexed intermediate waveform, and indicating a time assignment for each system analog and digital data signal multiplexed within a predetermined time frame format for the time multiplexed first baseband waveform.

2. A wide band, wide area FM-SCA radio system for transmitting system analog and digital data signals, said system comprising:

first means for transmitting the system analog and digital data signals to participating FM stations throughout a wide geographic area;

each participating FM station having apparatus including:

means for receiving the system analog and digital data signals;

first means for demodulating and processing the received system analog signals;

second means for demodulating and processing the received system digital data signals to generate a baseband digital data waveform representing a digital data stream;

means for time multiplexing the baseband digital data waveform and at least one of the demodulated and processed system analog signals to form an intermediate waveform having a frequency range substantially corresponding to entire legally permitted frequency bandwidth for SCA transmission;

means for generating a control signal for inclusion in the intermediate waveform to enable receiver processing of any selected system analog or digital data signal transmitted by the participating FM station;

means for combining the intermediate waveform and a regular FM baseband waveform into a composite baseband waveform;

means for FM modulating the composite baseband waveform onto a station carrier frequency signal of the participating FM station;

second means for transmitting the FM modulated signal from the participating FM station;

the second demodulating and processing means including a demodulator for demodulating the system digital data signals;

a frame control computer to which the demodulated digital data signals are applied for processing to the baseband digital data waveform;

the frame control computer including means for generating a clock signal from which boundary markers are generated for successive data frames;

the control signaling generating means including means for generating a control data packet for inclusion in each data frame within an assigned frame time segment;

means for dividing digital message data from the system digital data signals into successive data packets for inclusion in each of successive data frames within another assigned frame time segment;

a third frame time segment of predetermined time length being assigned for analog signal retransmission in each data frame; and the baseband digital data waveform including the control and data packets in each of successive time frames.

3. The FM-SCA radio system of claim 2 wherein the clock signal generating means generates the clock signal as a function of an FM station pilot signal included in the composite baseband waveform.

4. The FM-SCA radio system of claim 2 wherein:

the control data packet in each data time frame defines at least one frame timepoint for at least one system analog signal selected for station retransmission; and the clock signal generating means generates a synchronizing signal for controlling the time multiplexing means in accordance with the one frame timepoint.

5. A wide band, wide area FM-SCA radio transmission system for retransmitting a plurality of system analog and digital data signals received by each of a plurality of participating FM stations from a central station to FM-SCA receivers in the respective station transmission areas, each participating FM station having apparatus comprising:

means for receiving the system analog and digital data signals;

first means for demodulating and processing the received system analog signals;

second means for demodulating and processing the received system digital data signals to generate a baseband digital data waveform representing a digital data system;

means for time multiplexing the baseband digital data waveform and at least one of the demodulated and processed system analog signals to form an intermediate waveform having a frequency range substantially corresponding to an entire legally permitted frequency bandwidth for SCA transmission;

means for generating a control signal for inclusion in the intermediate waveform to enable receiver processing of any selected system analog or digital data signal transmitted by the participating FM station;

means for combining the intermediate waveform and a regular FM baseband waveform into a composite baseband waveform;

means for FM modulating the composite baseband waveform onto a carrier frequency signal of the participating FM station; and means for transmitting the FM modulated signal from the participating FM station;

the control signal representing control information for the system analog and digital data signals transmitted from the participating FM station and being applied to the time multiplexing means for inclusion in the intermediate waveform; and the control information identifying the participating FM station as one that is a part of the FM-SCA radio system, providing indications for receiver synchronization to the time multiplexed intermediate waveform, and indicating a time assignment for each multiplexed system analog and digital data signal within a predetermined time frame format for the time multiplexed intermediate waveform.

6. The FM-SCA radio system of claim 5 wherein at least one of the system analog signals is a system audio signal and each participating FM station further has means for time compressing each received system audio signal prior to time multiplexing.

7. A wide band, wide area FM-SCA transmission system for retransmitting a plurality of system analog and digital data signals received by each of a plurality of participating FM stations from a central station to FM-SCA receivers in the respective station transmission areas, each participating FM station having apparatus comprising:

means for receiving the system analog and digital data signals;

first means for demodulating and processing the received system analog signals;

second means for demodulating and processing the received system digital data signals to generate a baseband digital data waveform representing a digital data stream;

means for time multiplexing the baseband digital data waveform and at least one of the demodulated and processed system analog signals to form an intermediate waveform having a frequency range substantially corresponding to an entire legally permitted frequency bandwidth for SCA transmission;

means for generating a control signal for inclusion in the intermediate waveform to enable receiver processing of any selected system analog or digital data signal transmitted by the participating FM station;

means for combining the intermediate waveform and a regular FM baseband waveform into a composite baseband waveform;

means for modulating the composite baseband waveform onto a carrier frequency signal of the participating FM station; and means for transmitting the FM modulated signal from the participating FM station;

the second demodulating and processing means including a demodulator for demodulating the system digital data signals;

a frame control computer to which the demodulated system digital data signals are applied for processing the baseband digital data waveform;

the frame control computer including means for generating a clock signal from which boundary markers are generated for successive data frames and from which time markers for first, second and third frame time segments are generated in each data frame;

the control signal generating means including means for generating a control data packet for inclusion in each data frame within the first frame time segment;

means for dividing digital message data from the system digital data signals into successive data packets for inclusion in each data frame within the second frame time segment;

the third frame time segment having a predetermined time length assigned for analog signal retransmission; and the base band digital data waveform including successive data frames.

8. The FM-SCA radio transmission system of claim 7 wherein the clock signal generating means generates the clock signal as a function of an FM station pilot signal included in the composite baseband waveform.

9. The FM-SCA radio system of claim 7 wherein:

the control data packet in each time data frame defines at least one frame timepoint for at least one system analog signal selected for station retransmission; and the clock signal generating means generates a synchronizing signal for controlling the time multiplexing means in accordance with the one frame timepoint.

10. The FM-SCA radio system of claim 7 wherein the frame control computer further includes:

means for storing digital message data from respective digital data signals in respective message buffers;

means for building respective data packets in respective packet buffers during successive time frames under control of the frame boundary markers; and means for serializing data from successive packet buffers as the packet buffers become substantially filled thereby generating the baseband digital data waveform as a digital data stream.

11. The FM-SCA radio system of claim 10 wherein the control data packet is a first packet stored in each packet buffer and the control data packet includes control information wherein:

the control information identifies the participating FM station as one that is a part of the FM-SCA radio system, provides indications for receiver synchronization to the time multiplexed intermediate waveform, and indicates a time assignment for each multiplexed system analog and digital data signal within a predetermined time frame format for the time multiplexed intermediate waveform.

12. An FM-SCA radio receiver for use in an FM-SCA radio transmission system having participating FM radio stations that transmit a signal formed by modulating a composite baseband waveform onto a station carrier frequency signal, the composite baseband being formed by combining a regular FM baseband waveform with an intermediate SCA waveform which has a frequency range substantially corresponding to an entire legally permitted frequency bandwidth for SCA transmission and is formed from a plurality of time multiplexed digital data and analog signals and a digital control signal that enables receiver processing of any selected system digital data or analog signal, said FM-SCA receiver comprising:

means for demodulating a received FM modulated signal to generate the composite baseband waveform;

first means for separately processing the regular FM baseband waveform;

second means for separately processing an SCA portion of the composite baseband waveform to generate an intermediate waveform and further to generate the system digital data signals and analog signals;

third means for separately processing the system analog signals for output;

fourth means for separately processing the system digital data signals and for selecting, for output, digital message data addressed to the FM-SCA receiver;

the fourth processing means including means for generating frame synchronization signals from received digital control signals;

means for producing a control information signal from each received digital control signal; and means responsive to the frame synchronization signals and the control information signals to control output of any selected system analog signal.

13. The FM-SCA radio receiver of claim 12 wherein:

means are provided for responding to the frame synchronization signals to receive data represented by the system digital data signals as successive data packets; and means are provided for processing, for output, message data packets addressed to the FM-SCA receiver.

14. An FM-SCA radio receiver for use in an FM-SCA radio transmission system having participating FM radio stations that transmit a signal formed by FM modulating a composite baseband waveform onto a station carrier frequency signal, the composite baseband waveform being formed by combining a regular FM baseband waveform with an intermediate SCA waveform which has a frequency range substantially corresponding to an entire legally permitted frequency bandwidth for SCA transmission and as formed from a plurality of time multiplexed digital data and analog signals and a digital control signal that enables receiver processing of any selected system digital data or analog signal, said FM receiver comprising:

means for demodulating a received FM modulated signal to generate the composite baseband waveform;

first means for separately processing the regular FM baseband waveform;

second means for separately processing an SCA portion of the composite baseband waveform to generate an intermediate waveform and further to generate the system digital data signals and analog signals;

third means for separately processing the system analog signals for output; and fourth means for separately processing the system digital data signals and for selecting, for output, digital message data addressed to the FM-SCA receiver;

the system digital data and system analog signals are transmitted in successive time segments in each of successive data frames;

a control data packet corresponding to the digital control signal is included in each data frame; and means for logically responding to the control data packet to generate control outputs for analog signal control.

15. An FM-SCA radio receiver for use in an FM-SCA radio transmission system having participating FM radio stations that transmit a signal formed by FM modulating a composite baseband waveform into a station carrier frequency signal, the composite baseband waveform being formed by combining a regular FM baseband waveform with an intermediate SCA waveform which has a frequency range substantially corresponding to an entire legally permitted frequency bandwidth for SCA transmission and is formed from a plurality if time multiplexed digital data and analog signals and a digital control signal that enables receiver processing of any selected system digital data or analog signal, said FM-SCA receiver comprising:

means for demodulating a received FM modulated signal to generate the composite baseband waveform;

first means for separately processing the regular FM baseband waveform;

second means for separately processing an SCA portion of the composite baseband waveform to generate an intermediate waveform and further to generate the system digital data signals and analog signals;

third means for separately processing the system analog signals for output; and fourth means for separate processing the system digital data signals and for selecting, for output, digital message data addressed to the FM-SCA receiver;

the fourth processing means including a digital parsing computer;

means for generating frame synchronization signals from received digital control signals;

the paring computer having means for receiving data represented by the digital data signals as successive message data packets;

the parsing computer further having means for processing, for output, message data packets addressed to the FM-SCA receiver;

the system digital data and system analog signals transmitted in successive time segments in each of successive data frames;

a control data packet corresponding to the digital control signal included in each data frame; and the parsing computer having means for responding logically to the control data packets to generate control outputs for analog signal control.

16. The FM-SCA radio receiver of claim 15 wherein:

each control data packet includes data representing the control packet length and timing data for message data packet control and for analog signal control.

17. An FM-SCA radio receiver for use in an FM-SCA radio transmission system having participating FM radio stations that transmit a signal formed by modulating a composite baseband waveform onto a station carrier frequency signal, the composite baseband waveform being formed by combining a regular FM baseband waveform with an intermediate SCA waveform which has a frequency range substantially corresponding to an entire legally permitted frequency bandwidth for SCA transmission and is formed from a plurality of time multiplexed digital data and analog signals and a digital control signal that enables receiver processing of any selected system digital data or analog signal, said FM-SCA receiver comprising:

means for demodulating a received FM modulated signal to generate the composite baseband waveform;

first means for separately processing the regular FM baseband waveform;

second means for separately processing an SCA portion of the composite baseband waveform to generate an intermediate waveform and further to generate the system digital data signals and analog signals;

third means for separately processing the system analog signals for output; and fourth means for separately processing the system digital data signals and for selecting, for output, digital message data addressed to the FM-SCA receiver; and means for generating an FM station pilot signal from an FM modulated signal received from a participating FM station to provide for synchronous signal processing in the FM-SCA receiver.

18. A wide band, wide area FM-SCA radio system for transmitting system digital data signals, said system comprising:

first means for transmitting the system digital data signals to participating FM stations throughout a wide geographic area;

each participating FM station having apparatus including;

means for receiving the system digital data signals;

means for demodulating and processing the received system digital data signals to generate a baseband digital data waveform representing a digital data stream;

means for a single sideband modulating the baseband digital data waveform to form an intermediate waveform having a frequency range substantially corresponding to an entire legally permitted frequency bandwidth for SCA transmissions;

means for generating a digital control system signal for inclusion in the intermediate waveform to enable receiver processing of any selected system digital data signal transmitted by the participating FM station;

means for combining the intermediate waveform and a regular FM baseband waveform into a composite baseband waveform;

means for FM modulating the composite baseband waveform onto a carrier frequency signal of the participating FM station; and second means for transmitting the FM modulated signal from the participating FM station;

the demodulating and processing means including a demodulator for demodulating the system digital data signals;

a frame control computer to which the demodulated system digital data signals are applied for processing to the baseband digital data waveform;

the frame control computer including means for generating a clock signal from which boundary markers are generated for successive data frames and from which time markers are generated for first and second time segments in each data frame;

the control signal generating means including means for generating a control data packet for inclusion in each data frame within the first frame time segment;

means for dividing digital message data from the system digital data signals into successive data packets for inclusion in each data frame within the second frame time segment; and the baseband digital data waveform including the control data packet and the data packets respectively and successively in the first and second frame time segments in each data frame.

19. A wide band, wide area FM-SCA radio transmission system for retransmitting at least a plurality of system digital data signals received by each of a plurality of participating FM stations from a central station to FM-SCA receivers in the respective station transmission areas, each participating FM station having apparatus comprising:

means for receiving the system digital data signals;

means for demodulating and processing received system digital data signals to generate a baseband digital waveform representing digital data stream;

means for single sideband modulating the baseband digital data waveform to form an intermediate waveform having a frequency range substantially corresponding to the entire legally permitted frequency bandwidth for SCA transmission;

means for generating a digital control signal for inclusion in the intermediate waveform to enable receiver processing of system digital data signals transmitted by the FM station;

means for combing the intermediate waveform and a regular FM based waveform into a composite baseband waveform;

means for FM modulating the composite baseband waveform onto a frequency signal of the participating FM station;

means for transmitting the FM modulated signal from the participating FM station;

the demodulating and processing means including a demodulator for demodulating the system digital data signals;

a frame control computer to which the demodulated system digital data signals are applied for processing to the baseband digital data waveform;

the frame control computer including means for generating a clock signal from which boundary markers are generated for successive data frames and from which time markers are generated for first and second time segments in each data frame;

the control data signal generating means including means for generating a control data packet for inclusion in each data frame within the first frame time segment;

means for dividing digital message data from the system digital data signals into successive data packets for inclusion in each data frame within the second frame time segment; and the baseband digital waveform including the control and data packets respectively and successively in the first and second frame time segments in each data frame.

20. The FM-SCA radio system of claim 19 wherein the clock generating means generates the clock signal as a function of an FM station pilot signal included in the composite baseband waveform.

21. FM-SCA radio system of claim 19 wherein the frame control computer further includes:

means for storing digital message data from respective system digital data signals in respective message buffers;

means for building respective data packets in respective packet buffers during successive time frame under control of the boundary markers; and means for serializing data from successive packet buffers as the packet buffers become substantially filled thereby generating the baseband digital data waveform.

22. The FM-SCA radio system of claim 19 wherein the control data packet is a first packet stored in each packet buffer and the control data packet includes control information and wherein:

the control information identifies the participating FM station as one that is a part of the FM-SCA radio system, provides indications for receiver synchronization, and indicates the time assignment for the control and the data packet digital data packets within a predetermined time frame format.

23. A wide band, wide area FM-SCA radio system for transmitting at least system analog signals, said system comprising:

first means for transmitting the system analog signals to participating FM stations throughout a wide geographic area;

each participating FM station having apparatus including:

means for receiving the system analog signals;

first means for demodulating and processing the received system analog signals;

means for time multiplexing the demodulated and processed system analog signals to form an intermediate waveform having a frequency range substantially corresponding to an entire legally permitted frequency bandwidth for SCA transmission;

means for generating a control signal for inclusion in the intermediate waveform to enable receiver processing of any selected system analog signal retransmitted by the participating FM station;

the control signal generating means including a frame control computer;

the frame control computer having means for generating a clock signal from which boundary markers are generated for successive data frames and from which time markers are generated for first and second time segments in each data frame;

the control signal generating means including means for generating a control data packet for inclusion in each data frame within the first frame time segment;

the second frame time segment having a predetermined time length for the system analog signals in the time multiplexed intermediate waveform;

means for combining the first baseband waveform and a regular FM based waveform into a composite baseband waveform;

means for FM modulating the composite baseband waveform onto a carrier frequency signal of the participating FM station;

second means for transmitting the FM modulated signal from the participating FM station;

the control signal represents control information for the system analog signals transmitted by the participating FM station; and the control information identifies the participating FM station from which the FM modulated signal is transmitted as one that is part of the FM-SCA radio system, provides indications for receiver synchronization to the time multiplexed intermediate waveform, and indicates a time assignment for each system analog signal multiplexed within a predetermined time frame format for the time multiplexed intermediate waveform.

24. A wide band, wide area FM-SCA radio system for transmitting at least system analog signals, said system comprising:

first means for transmitting the system analog signals to participating FM stations throughout a wide geographic area;

each participating FM station having apparatus including:

means for receiving the system analog signals;

first means for demodulating and processing the received system analog signals;

means for time multiplexing the demodulated and processed system analog signals to form an intermediate waveform having a frequency range substantially corresponding to an entire legally permitted frequency bandwidth for SCA transmission;

means for generating a control signal for inclusion in the intermediate waveform to enable receiver processing of any selected system analog signal retransmitted by the participating FM station;

the control signal generating means including a frame control computer;

the frame control computer having means for generating a clock signal from which boundary markers are generated for successive data frames and from which time markers are generated for first and second time segments in each data frame;

the control signal generating means including means for generating control data packet for inclusion in each data frame within the first time segment;

the second frame time segment having a predetermined time length for the system analog signals in the time multiplexed intermediate waveform;

means for combining the first baseband waveform and a regular FM baseband waveform into a composite baseband waveform;

means for FM modulating the composite baseband waveform onto a carrier frequency signal of the participating FM station; and second means for transmitting the FM modulated signal from the participating FM station;

the control data packet in each data frame defining at least one frame timepoint for station transmission of at least one system analog signal selected for station retransmission; and the clock generating means generating a synchronizing signal for controlling the time multiplexing means in accordance with each analog signal frame timepoint.

25. A wide band, wide area FM-SCA radio system for transmitting at least system analog signals, said system comprising:

first means for transmitting the system analog signals to participating FM stations throughout a wide geographic area;

each participating FM station having apparatus including:

means for receiving the system analog signals;

first means for demodulating and processing the received system analog signals;

means for time multiplexing the demodulated and processed system analog signals to form an intermediate waveform having a frequency range substantially corresponding to an entire legally permitted frequency bandwidth for SCA transmission;

means for generating a control signal for inclusion in the intermediate waveform to enable receiver processing of any selected system analog signal retransmitted by the participating FM station;

the control signal generating means including a frame control computer;

the frame control computer having means for generating a clock signal from which boundary markers are generated for successive data frames and from which time markers are generated for first and second time segments in each data frame;

the control signal generating means including means for generating a control data packet for inclusion in each data frame within the first time frame segment;

the second frame time segment having a predetermined time length for the system analog signals in the time multiplexed intermediate waveform;

means for combining the first baseband waveform and a regular FM baseband waveform into a composite baseband waveform;

means for modulating the composite baseband waveform onto a carrier frequency signal of the participating FM station; and second means for transmitting the FM modulated signal from the participating FM station;

a plurality of FM-SCA receivers for receiving the transmitted FM modulated signal in the transmitting area of the participating FM station, each of which includes:

second means for demodulating the received FM modulated signal to generate the composite baseband waveform;

another first means for separately processing the regular FM baseband waveform included in the composite baseband waveform; and another second means for separately processing an SCA portion of the composite baseband waveform to generate the intermediate waveform and further to generate the system analog signals for output in accordance with the control signal;

means for generating frame synchronization signals from the intermediate waveform;

means for producing a control information signal from the intermediate waveform; and means responsive to the frame synchronization signals and the control information signal to select for output any analog signal.

26. A wide band, wide area FM-SCA radio transmission system for retransmitting at least a plurality of system analog signals received by each of a plurality of participating FM stations from a central station to FM-SCA receivers in the respective station transmission areas, each participating FM station having apparatus comprising:

means for receiving the system analog signals;

first means for demodulating and processing the received system analog signals;

means for time multiplexing the demodulated and processed system analog signals to form an intermediate waveform having a frequency range substantially corresponding to an entire legally permitted frequency bandwidth for SCA transmission;

means for generating a control signal for inclusion in the intermediate waveform to enable receiver processing of any selected system analog signal transmitted by the participating FM station;

the control signal generating means including a frame control computer;

the frame control computer having means for generating a clock signal from which boundary markers are generated for successive data frames and from which time markers for first and second frame time segments are generated in each data frame;

means for generating a control data packet for inclusion in each data frame to form the control signal within the first frame time segment;

the second frame time segment having a predetermined time length and having the system analog signals in the time multiplexed intermediate waveform assigned thereto;

means for combining the intermediate waveform and a regular FM baseband waveform onto a composite baseband waveform;

means for FM modulating the composite baseband waveform onto a carrier frequency signal of the participating FM station;

means for transmitting the FM modulated signal from the participating FM station;

the control signal representing control information for the system analog signals transmitted by the participating FM station and applied to the multiplexing means for inclusion in the first baseband waveform; and the control information identifying the participating FM station from which the FM modulated signal is transmitted as one that is a part of the FM-SCA radio system, providing indications for receiver synchronization to the time multiplexed first baseband waveform, and indicating a time assignment for each system analog signal multiplexed within a predetermined time frame format for the time multiplexed first baseband waveform.

27. A wide band, wide area FM-SCA radio transmission system for retransmitting at least a plurality of system analog signals received by each of a plurality of participating FM stations from a central station to FM-SCA receivers in the respective station transmission areas, each participating FM station having apparatus comprising:

means for receiving the system analog signals;

first means for demodulating and processing the received system analog signals;

means for time multiplexing the demodulated and processed system analog signals to form an intermediate waveform having a frequency range substantially corresponding to an entire legally permitted frequency bandwidth for SCA transmission;

means for generating a control signal for inclusion in the intermediate waveform to enable receiver processing of any selected system analog signal transmitted by the participating FM station;

the control signal generating means including a frame control computer;

the frame control computer having means for generating a clock signal from which boundary markers are generated for successive data frames and from which time markers for first and second frame time segments are generated in each data frame;

means for generating a control data packet for inclusion in each data frame to form the control signal within the first frame time segment;

the second frame time segment having a predetermined time length and having the system analog signals in the time multiplexed intermediate waveform assigned thereto;

means for combining the intermediate waveform and a regular FM baseband waveform onto a composite baseband waveform;

means for FM modulating the composite baseband waveform onto a carrier frequency signal of the participating FM station; and means for transmitting the FM modulated signal from the participating FM station;

the control data packet in each time frame defining at least one frame timepoint for station transmission of at least one system analog signal selected for station retransmission; and the clock generating means generating a synchronizing signal for controlling the time multiplexing means in accordance with each analog signal frame timepoint.

28. An FM-SCA radio receiver for use in an FM-SCA radio transmission system having participating FM radio stations that transmit a signal formed by modulating a composite baseband waveform onto a station carrier frequency signal, the composite baseband waveform being formed by combining a regular FM baseband waveform with an SCA baseband waveform which has a frequency range substantially corresponding to the entire legally permitted frequency bandwidth for SCA transmission and is formed from a plurality of time multiplexed system analog signals and a digital control signal that enables receiver processing of any selected system analog signal, said FM-SCA receiver comprising:

means for demodulating the received FM modulated signal to generate the composite baseband waveform;

first means for separately processing the regular FM baseband waveform included in the composite baseband waveform;

second means for separately processing an SCA portion of the composite baseband waveform to generate the first baseband waveform and further to generate the digital control signal and the system analog signals;

third means for separately processing the system analog signals for output;

means for generating frame synchronization signals from received digital control signals;

means for producing a control information signal from each received digital control signal;

means responsive to the frame synchronization signals and the control information signals to control the output of any selected system analog signal;

the system analog signals transmitted in successive data frames and wherein:

a control data packet corresponding to the digital control signal included in each data frame;

means for logically responding to each control data packet to generate control outputs fir system analog signal control;

a digital computer having means for responding logically to each control data packet to generate control outputs for system analog signal control; and each control data packet including data representing a control packet length and timing data for system analog signal control.

29. A method for operating a wide band, wide area FM-SCA radio system to transmit at least system analog signals, the method comprising the steps of:

transmitting the system analog signals to participating FM stations throughout a wide geographic area;

operating each participating FM station with substeps including:

receiving the system analog signals;

demodulating and processing the received system analog signals;

time multiplexing the demodulated and processed system analog signals to form an intermediate waveform having a frequency range substantially corresponding to an entire legally permitted frequency bandwidth for SCA transmission;

operating a frame control computer to generate a control signal for inclusion in the intermediate waveform to enable receiver processing of any selected system analog signal transmitted by the FM station;

generating a clock signal from which boundary markers are generated for successive data frames and from which time markers are generated for first and second time segments in each data frame;

generating a control data packet for inclusion in each data frame within the first frame time segment thereby forming the control signal;

assigning a second frame time segment a predetermined time length for the time multiplexed system analog signals;

combining the intermediate waveform and a regular FM baseband waveform into a composite baseband waveform;

FM modulating the composite baseband waveform onto a carrier frequency signal of the participating FM station; and transmitting the FM modulated signal from the participating FM station.

30. A wide band, wide area FM-SCA radio transmission system for retransmitting a plurality of system analog and digital data signals received by each of a plurality of participating FM stations from a central station to FM-SCA receivers in the respective station transmission areas, each participating FM station having apparatus comprising:

means for receiving the system analog and digital data signals;

first means for demodulating and processing the received system analog signals;

second signal means for demodulating and processing the received system digital data signals to generate a baseband digital data waveform representing a digital data stream;

means for time multiplexing the baseband digital data waveform and at least one of the demodulated and processed system analog signals to form an intermediate waveform having a frequency range substantially corresponding to an entire legally permitted frequency bandwidth for SCA transmission;

means for generating a control signal for inclusion in the intermediate waveform to enable receiver processing of any selected system analog or digital data signal transmitted by the participating FM station;

means for combining the intermediate waveform and a regular FM baseband waveform into a composite baseband waveform;

means for FM modulating the composite baseband waveform onto a carrier frequency signal of the participating FM station; and means for transmitting the FM modulated signal from the participating FM station:

means for generating a station pilot tone signal to enable synchronous clocking of time dividing operation of the time multiplexing means and to be included in the composite baseband waveform to enable receiver synchronization to the intermediate waveform.

31. An FM-SCA radio receiver for use in an FM-SCA radio transmission system having participating FM radio stations that transmit a signal formed by FM modulating a composite baseband waveform onto a station carrier frequency signal, the composite baseband waveform being formed by combining a regular FM baseband waveform with an intermediate SCA waveform which has a frequency range substantially corresponding to an entire legally permitted frequency bandwidth for SCA transmission and is formed from a plurality of time multiplexed digital data and analog signals and a digital control signal that enables receiver processing of any selected system digital data or analog signal, said FM-SCA receiver comprising:

means for demodulating a received FM modulated signal to generate the composite baseband waveform;

first means for separately processing the regular FM baseband waveform;

second means for separately processing an SCA portion of the composite baseband waveform to generate an intermediate waveform and further to generate the system digital data signals and analog signals;

third means for separately processing the system analog signals for output;

fourth means for separately processing the system digital data signals and for selecting, for output, digital message data addressed to the FM-SCA receiver;

the analog signals being time compressed prior to transmission and the processing provided by the third means including time expanding the analog signals.

32. A method for operating a wide band, wide area FM-SCA radio transmission system to retransmit a plurality of system analog and digital data signals received by each of a plurality of participating FM stations from a central station to FM receivers in the respective station transmission areas, the steps of the method comprising the following steps for operating each participating FM station:

receiving the system analog and digital data signals;

demodulating and processing the received system analog signals;

demodulating and processing the received system digital data signals to generate a baseband digital data waveform representing a digital data stream;

time multiplexing the baseband digital data waveform and at least one of the demodulated and processed system analog signals to form an intermediate waveform having a frequency range substantially corresponding to an entire legally permitted frequency bandwidth for SCA transmission;

generating a control signal for inclusion in the intermediate waveform to enable receiver processing of any selected system analog or digital data signal transmitted by the participating FM station;

combining the intermediate waveform and a regular FM baseband waveform into a composite baseband waveform;

FM modulating the composite baseband waveform onto a carrier frequency signal of the participating FM station; and transmitting the FM modulated signal from the participating FM station; and the processing of the analog signals including time compressing the analog signals.

33. A wide band, wide area FM-SCA radio transmission system for retransmitting at least a plurality of system analog signals received by each of a plurality of participating FM stations from a central station to FM-SCA receivers in the respective station transmission areas, each participating FM station having apparatus comprising:

means for receiving the system analog signals;

first means for demodulating and processing the received system analog signals;

means for time multiplexing the demodulated and processed system analog signals to form an intermediate waveform having a frequency range substantially corresponding to an entire legally permitted frequency bandwidth for SCA transmission;

means for generating a control signal for inclusion in the intermediate waveform to enable receiver processing of any selected system analog signal transmitted by the participating FM station;

the control signal generating means including a frame control computer;

the frame control computer having means for generating a clock signal from which boundary markers are generated for successive data frames and from which time markers for first and second frame time segments are generated in each data frame;

means for generating a control data packet for inclusion in each data frame to form the control signal within the first frame time segment;

the second frame time segment having a predetermined time length and having the system analog signals in the time multiplexed intermediate waveform assigned thereto;

means for combining the intermediate waveform and a regular FM based waveform onto a composite baseband waveform;

means for modulating the composite baseband waveform onto a carrier frequency signal of the participating FM station;

means for transmitting the FM modulated signal from the participating FM station; and the processing provided by the first means including time compressing the analog signals.

34. An FM-SCA radio receiver for use in an FM-SCA radio transmission system having participating FM radio stations that transmit a signal formed by FM modulating a composite baseband waveform onto a station carrier frequency signal, the composite baseband waveform being formed by combining a regular FM baseband waveform with an SCA baseband waveform which has a frequency range substantially corresponding to an entire legally permitted frequency bandwidth for SCA transmission and is formed from a plurality of time multiplexed system analog signals and digital control signal that enables receiver processing of any selected system analog signal, said FM-SCA receiver comprising:

means for demodulating the received FM modulated signal to generate the composite baseband waveform;

first means for separately processing the regular FM baseband waveform included in the composite baseband waveform;

second means for separately processing an SCA portion of the composite waveform to generate an intermediate waveform and further to generate the digital control signal and the system analog signals;

third means for separately processing the system analog signals for output;

means for generating frame synchronization signals from received digital control signals;

means for producing a control information signal from each received digital control signal;

means responsive to the frame synchronization signals and the control information signals to control the output of any selected system analog signal;

the analog signals being time compressed prior to transmission and the processing provided by the third means including time expanding the analog signals.

35. A wide band, wide area FM-SCA radio transmission system for retransmitting a plurality of system analog and digital data signals received by each of a plurality of participating FM stations from a central station to FM-SCA receivers in the respective station transmission area, each participating FM station having apparatus comprising:

a first system for receiving the system analog and digital data signals;

a first circuit for demodulating and processing the received system analog signals;

a second circuit for demodulating and processing the received system digital data signals to generate a baseband digital data waveform representing a digital data stream;

a multiplexer for multiplexing the baseband digital data waveform and at least one of the demodulated and processed system analog signals to form an intermediate waveform having a frequency range substantially corresponding ti the entire legally permitted frequency bandwidth for SCA transmission;

a second system for generating a control signal for inclusion in the intermediate waveform to enable receiver processing of any selected system analog or digital data signal transmitted by the participating FM station;

a third circuit for combining the intermediate waveform and a regular FM baseband waveform into a composite baseband waveform;

a fourth circuit for FM modulating the composite baseband waveform onto a carrier frequency signal of participating FM station;

a third system for transmitting the FM modulated signal from the participating FM station; and the processing provided by the first circuit includes time compressing the analog signals.

36. An FM-SCA radio receiver for use in a an FM-SCA radio transmission system having participating FM radio stations that transmit a signal formed by FM modulating a composite baseband waveform onto a station carrier frequency signal, the composite baseband waveform being formed by combining a regular FM baseband waveform with an SCA baseband waveform which has a frequency range substantially corresponding to an entire legally permitted frequency bandwidth for SCA transmission and is formed from a plurality of time multiplexed system digital data and system analog signals and a digital control signal that enables receiver processing of any selected system digital data or system analog signal, said FM-SCA receiver comprising:

a first circuit for demodulating the received FM modulated signal to generate the composite baseband waveform;

a second circuit for separately processing the regular FM baseband waveform;

a third circuit for separately processing an SCA portion of the composite baseband waveform to generate an intermediate waveform and further to generate the system digital data signals and the system analog signals;

a fourth circuit for separately processing the system analog signals for output;

a system for separately processing the system digital data signals and for selecting , for output, digital message data addressed to the FM receiver; and the processing provided by the second circuit including time expanding the analog signals.

37. The FM-SCA radio system of claim 5 wherein means are further provided for SSB modulating the baseband digital data waveform and the at least one analog signal in forming the intermediate waveform.

38. The FM-SCA radio system of claim 7 wherein means are further provided for SSB modulating the baseband digital data waveform and the at least one analog signal in forming the intermediate waveform.

39. The FM-SCA radio system of claim 8 wherein means are further provided for SSB modulating the baseband digital data waveform and the at least one analog signal in forming the intermediate waveform.

40. The FM-SCA radio system of claim 9 wherein means are further provided for SSB modulating the baseband digital data waveform and the at least one analog signal in forming the intermediate waveform.

* * * * *

UNITED STATES PATENT AND TRADEMARK OFFICE

CERTIFICATE OF CORRECTION

PATENT NO. : 5,428,610

DATED : June 27, 1995

INVENTOR(S) : Mark Davis

It is certified that error appears in the above-indentified patent and that said Letters Patent is hereby corrected as shown below:

Claim 7, col. 23, line 64, after "for", insert --FM--.

Claim 12, col. 24, line 65, after "by", insert --FM--.

col. 26, line 37, "separate" should read "separately--.

Claim 17, col. 26, line 65, after "by", insert --FM--.

Claim 18, col. 27, line 36; ";" should read --:--.

Claim 28, col. 34, line 4, "fir" should read --for--.

UNITED STATES PATENT AND TRADEMARK OFFICE

CERTIFICATE OF CORRECTION

PATENT NO. : 5,428,610

DATED : June 27, 1995

INVENTOR(S) : Mark Davis

It is certified that error appears in the above-indentified patent and that said Letters Patent is hereby corrected as shown below:

Claim 35, col. 37, line 55, "ti" should read --to--.

Claim 36, col. 38, line 40, "selecting , " should read --selecting,--.

Signed and Sealed this

Twenty-eighth Day of November 1995

Attest:

Bruce Lehman

BRUCE LEHMAN

Attesting Officer

*Commissioner of Patents and Trademarks*